(12) United States Patent
Rao et al.

(10) Patent No.: US 12,217,308 B2
(45) Date of Patent: Feb. 4, 2025

(54) IN-ORDER PROCESSING OF NETWORK PACKETS

(71) Applicant: Nasdaq, Inc., New York, NY (US)

(72) Inventors: Sandeep Rao, Southport, CT (US); Thomas Fay, Succasunna, NJ (US); Dominick Paniscotti, Totowa, NJ (US); Yuriy Buglo, New York, NY (US)

(73) Assignee: NASDAQ, INC., New York, NY (US)

( * ) Notice: Subject to any disclaimer, the term of this patent is extended or adjusted under 35 U.S.C. 154(b) by 353 days.

(21) Appl. No.: 17/883,347

(22) Filed: Aug. 8, 2022

(65) Prior Publication Data

US 2022/0377019 A1 Nov. 24, 2022

Related U.S. Application Data

(63) Continuation of application No. 16/522,316, filed on Jul. 25, 2019, now abandoned.

(Continued)

(51) Int. Cl.
| | | |
|---|---|---|
| *G06Q 40/04* | (2012.01) | |
| *G06F 9/48* | (2006.01) | |
| *G06F 9/54* | (2006.01) | |
| *H04J 3/06* | (2006.01) | |
| *H04L 43/16* | (2022.01) | |

(Continued)

(52) U.S. Cl.
CPC ............ *G06Q 40/04* (2013.01); *G06F 9/4881* (2013.01); *G06F 9/546* (2013.01); *H04J 3/065* (2013.01); *H04L 43/16* (2013.01); *H04L 47/283* (2013.01); *H04L 47/562* (2013.01); *H04L 47/6235* (2013.01); *H04L 65/102* (2013.01)

(58) Field of Classification Search
CPC ....... G06Q 40/04; G06F 9/4881; G06F 9/546; H04J 3/065; H04J 3/0661; H04J 3/0697; H04L 43/16; H04L 47/283; H04L 47/562; H04L 47/6235; H04L 65/102
See application file for complete search history.

(56) References Cited

U.S. PATENT DOCUMENTS

| | | | | |
|---|---|---|---|---|
| 5,701,480 A | * | 12/1997 | Raz ........................ | G06F 9/466 718/101 |
| 9,904,721 B1 | | 2/2018 | Holenstein et al. | |

(Continued)

FOREIGN PATENT DOCUMENTS

EP    3 197 108 A1    7/2017

OTHER PUBLICATIONS

PCT Transmittal of International Search Report and the Written Opinion in related PCT Appln. No. PCT/US2019/43571 mailed Oct. 22, 2019.

(Continued)

*Primary Examiner* — Redentor Pasia
(74) *Attorney, Agent, or Firm* — Nixon & Vanderhye, PC

(57) ABSTRACT

The described technology relates to a real-time processing of network packets. An example system relates to reordering messages received at a server over a communication network from distributed clients, in order to, among other things, eliminate or at least substantially reduce the effects of jitter (delay variance) experienced in the network. The reordering of messages may enable the example data processing application to improve the consistency of processing packets in the time order of when the respective packets entered a geographically distributed network.

19 Claims, 15 Drawing Sheets

Related U.S. Application Data

(60) Provisional application No. 62/721,973, filed on Aug. 23, 2018, provisional application No. 62/703,746, filed on Jul. 26, 2018.

(51) Int. Cl.
*H04L 47/283* (2022.01)
*H04L 47/56* (2022.01)
*H04L 47/62* (2022.01)
*H04L 65/102* (2022.01)

(56) References Cited

U.S. PATENT DOCUMENTS

| | | |
|---|---|---|
| 9,929,743 B1 | 3/2018 | Acuna-Rohter et al. |
| 10,147,137 B2 * | 12/2018 | Bent ................ G06Q 40/04 |
| 10,346,910 B2 * | 7/2019 | Katsuyama ........ G06Q 30/0206 |
| 10,585,729 B2 * | 3/2020 | Vaccaro ............... G06Q 40/04 |
| 2005/0088976 A1 | 4/2005 | Chafie |
| 2006/0080536 A1 | 4/2006 | Teppler |
| 2006/0259397 A1 * | 11/2006 | Schluetter ............ G06Q 20/10 705/37 |
| 2007/0165625 A1 | 7/2007 | Eisner |
| 2014/0280737 A1 | 9/2014 | Bicket et al. |
| 2015/0095627 A1 | 4/2015 | Dechene et al. |
| 2015/0302441 A1 * | 10/2015 | Katsuyama ........ G06Q 30/0206 705/36 R |
| 2015/0341881 A1 | 11/2015 | Hiltunen et al. |
| 2016/0104242 A1 | 4/2016 | Melton |
| 2016/0260173 A1 * | 9/2016 | Aisen ................. H04L 43/0852 |
| 2016/0267592 A1 | 9/2016 | Djurdjevic |
| 2017/0046783 A1 * | 2/2017 | Hosman ................ H04L 67/01 |
| 2018/0047099 A1 * | 2/2018 | Bonig ............... G06Q 10/1093 |
| 2018/0167492 A1 * | 6/2018 | Bonig ................... G06F 9/546 |
| 2018/0191624 A1 * | 7/2018 | Haynold ............... H04L 47/33 |
| 2018/0198566 A1 | 7/2018 | Yi et al. |
| 2019/0364004 A1 * | 11/2019 | Acuña-Rohter ........ H03M 7/30 |
| 2020/0160445 A1 * | 5/2020 | Katsuyama .......... G06Q 40/04 |
| 2021/0320877 A1 * | 10/2021 | Haynold ............... G06Q 40/04 |

OTHER PUBLICATIONS

European Patent Office Search Report dated Apr. 4, 2022 for Application No. 1983 9981.8, 9 pages.

* cited by examiner

| RBP (us) | #ofo msg before RB | #ofo msg after RB |
|---|---|---|
| 0 | 180K/10M | 180K/10M |
| 1 | 170K/10M | 170K/10M |
| 2 | 190K/10M | 190K/10M |
| 3 | 180K/10M | 180K/10M |
| 4 | 170K/10M | 160K/10M |
| 5 | 180K/10M | 120K/10M |
| 6 | 200K/10M | 56K/10M |
| 7 | 200K/10M | 16K/10M |
| 8 | 180K/10M | 2K/10M |
| 9 | 220K/10M | 200/10M |
| 10 | 220K/10M | 50/10M |

IN-ORDER PROCESSING OF NETWORK PACKETS

CROSS REFERENCE(S) TO RELATED APPLICATION(S)

This application is a continuation application of U.S. application Ser. No. 16/522,316 filed Jul. 25, 2019, which claims priority to U.S. Provisional Application No. 62/721,973 filed on Aug. 23, 2018 and to U.S. Provisional Application No. 62/703,746 filed on Jul. 26, 2018. The entire contents of U.S. application Ser. No. 16/522,316, U.S. Provisional Application No. 62/721,973 and U.S. Provisional Application No. 62/703,746 are incorporated herein by reference.

TECHNICAL OVERVIEW

The technology described herein relates to, inter alia, managing the effects of jitter in high-performance distributed systems.

BACKGROUND

Real-time electronic trading systems demand a high degree of time precision. That is, it is important, if not critical, that regardless of where respective orders for transactions are originated, that there is a high level of assurance from the system that a deterministic chronological ordering is observed in the processing of those transactions. For example, when users submit transactions such as buy/sell orders for investment instruments to an electronic trading system, the respective users may expect that the orders are processed, by the matching engine or the like in the electronic trading application, in order of the times at which the orders were made.

However, respective transactions from respective client devices, and even respective transactions from the same client device, may arrive at the electronic trading application running on the system's servers in a different ordering in time than that defined by their origination times at the client device(s). This difference may be due to multiple reasons such as, for example, differences in length and other characteristics in the network paths traversed by the transactions, differences in processing capabilities at devices from end-to-end, etc., which are inherent characteristics of communication networks and electronic systems. Thus, out of order arrivals of at least a small portion of all transactions at the destination is an inherent characteristic of distributed systems such as electronic trading systems that have geographically distributed client devices connected over a wide-area communication network.

As network transmission speeds and system processing speeds get faster, "jitter", which may be characterized as the variance in time for respective transaction to travel between the same two endpoints, becomes a more significant aspect of the overall time taken to complete a transaction. For example, an experiment on an existing electronic trading system showed an average jitter of approximately 3 microseconds, which amounted to 10% of the time taken for the system to acknowledge a transaction. As jitter becomes larger relative to the average time for a transaction to reach the server, it is likely that the percentage of transactions that arrive out of order will also rise.

Therefore, as more and more clients access the networks of electronic trading systems from locations that are geographically wide spread and as communication networks and system processing speeds get faster, it is important that systems and techniques are provided to reduce uncertainties caused by out of order arrivals of transactions in electronic trading systems and the like. Therefore, more new and useful techniques for reducing out of order arrivals of transactions at a server are sought.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

The described technology relates to a real-time order processing systems such as, for example, an electronic trading application for equities and other tradable investment instruments. An example system relates to reordering messages received at a server over a communication network from distributed clients, in order to, among other things, eliminate or at least substantially reduce the effects of jitter (delay variance) experienced in the network. The reordering of messages may enable the example electronic trading system to improve the consistency of executing orders (e.g., performing transactions for buying/selling electronic inventories) in, or according to estimates of, the time order of when the client's order entered the trading system's network. By improving the consistency with which each order is executed according to the time ordering with which the respective order entered the trading system's network, embodiments move closer to satisfying the users' expectation that orders are executed in the time order in which they were made at the client systems.

This summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

The technology described herein relates to, among other subjects, improving the performance of a transaction processing system such as, but not limited to, an electronic trading system. More particularly, the technology described here improves a server's processing of transactions by eliminating or at least substantially alleviating issues such as out of order arrival at the server of transactions (e.g. packets or other unit of application information) due to network characteristics such as, for example, jitter. In some example embodiments a reorder buffer is provided between the server and the network so that all or substantially all out of order transactions can be reordered by use of the buffer. In order to ensure that transactions are processed by the electronic trading system in the order that they were received at the electronic trading system's network, at least some embodiments require the respective transactions to be timestamped upon entry into the electronic trading system's network.

Figure 2A:
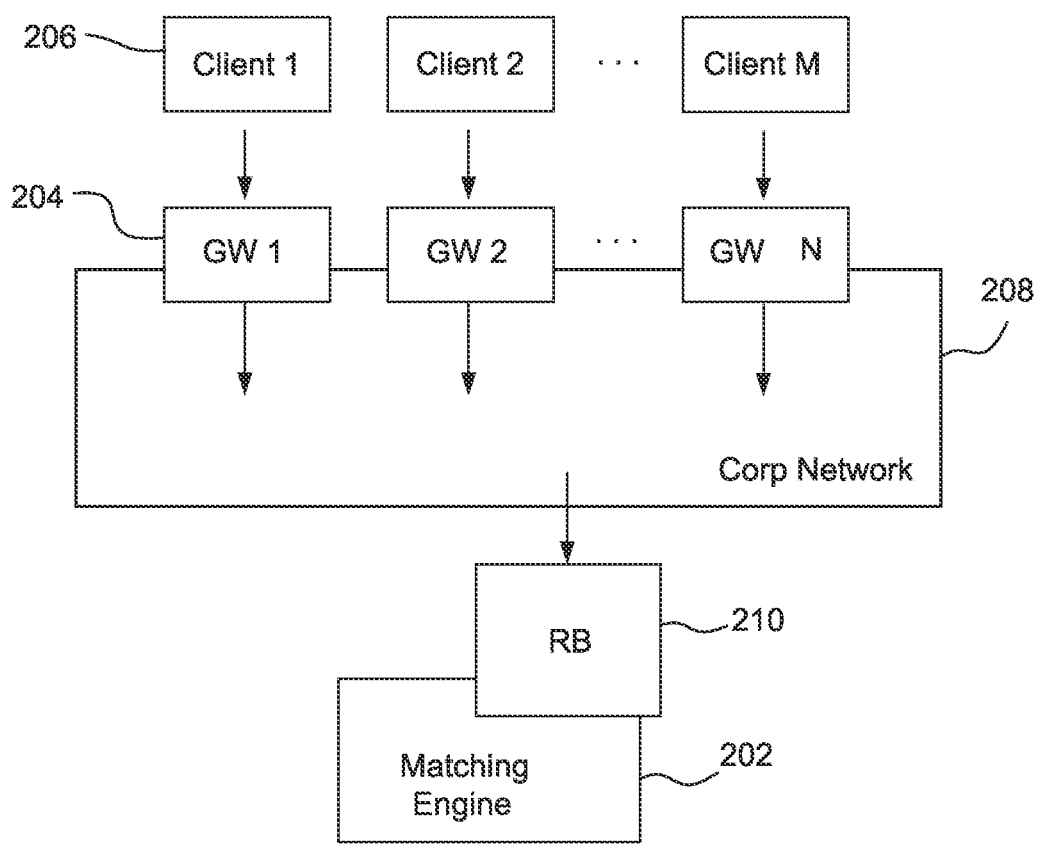
FIG. 2A illustrates a high level view of network infrastructure in which a re-ordering is performed at the matching engine, according to some example embodiments.
Figure 2B:
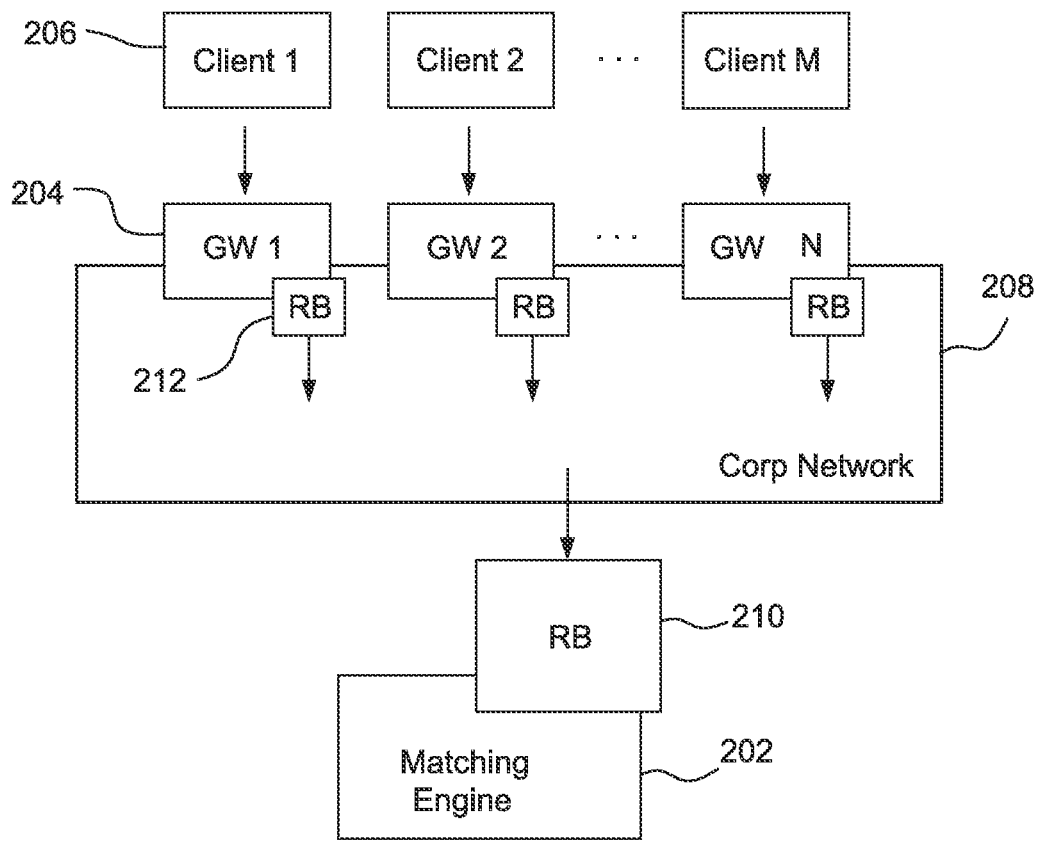
FIG. 2B illustrates a high level view of network infrastructure in which re-ordering is performed in a distributed manner, according to some example embodiments.
Figure 3:
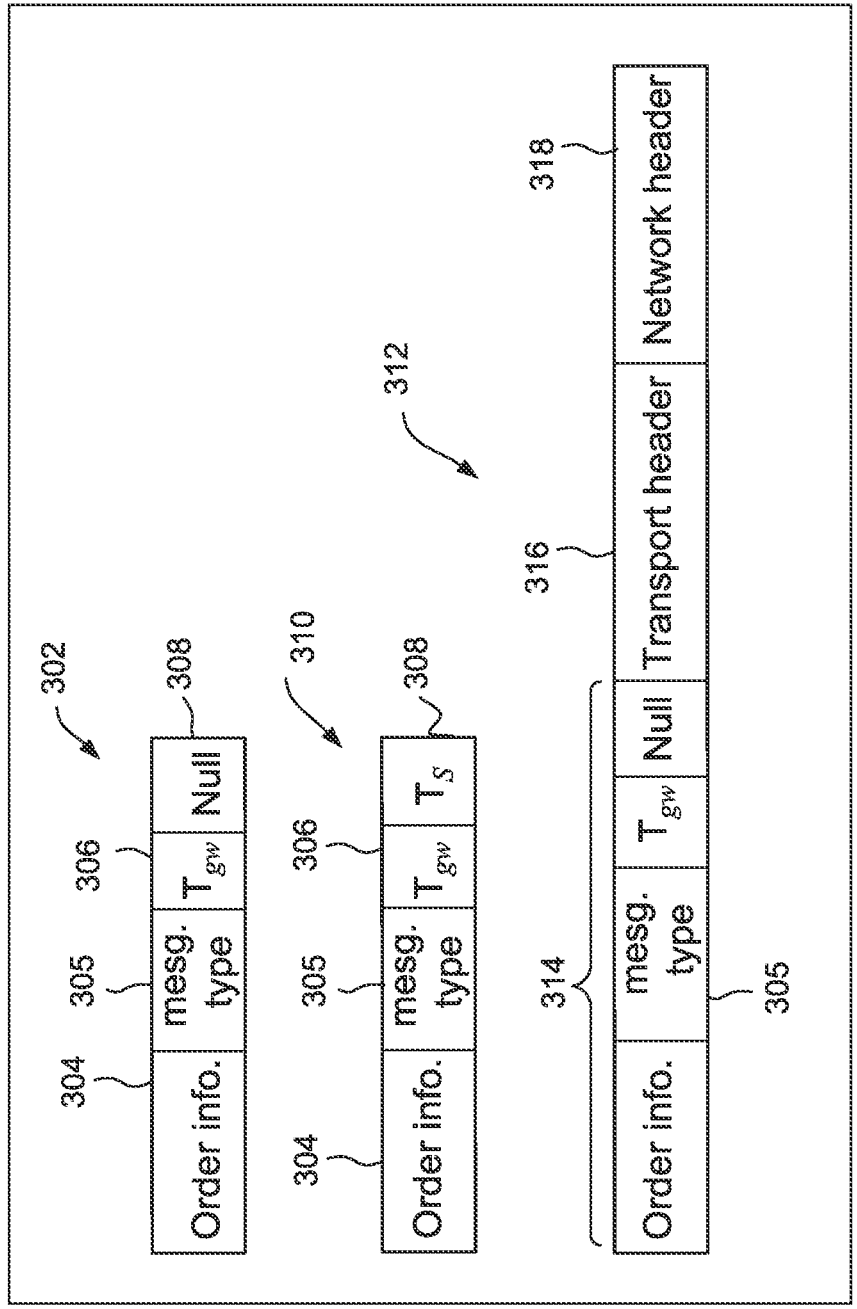
FIG. 3 schematically illustrates packet structures for orders, according to some example embodiments.
Figure 4:
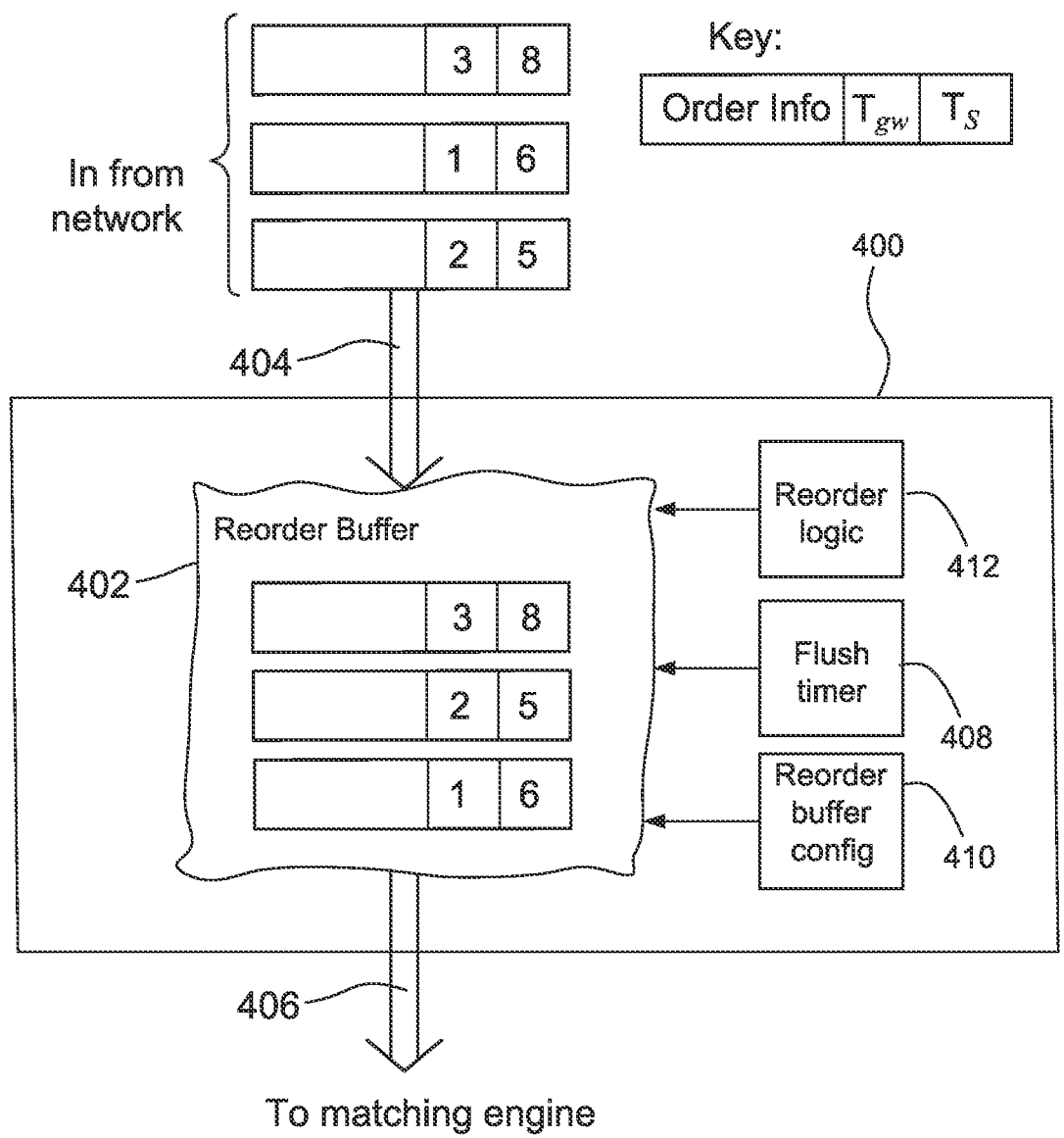
FIG. 4 illustrates an example re-order buffer, according to some example embodiments.
Figure 5:
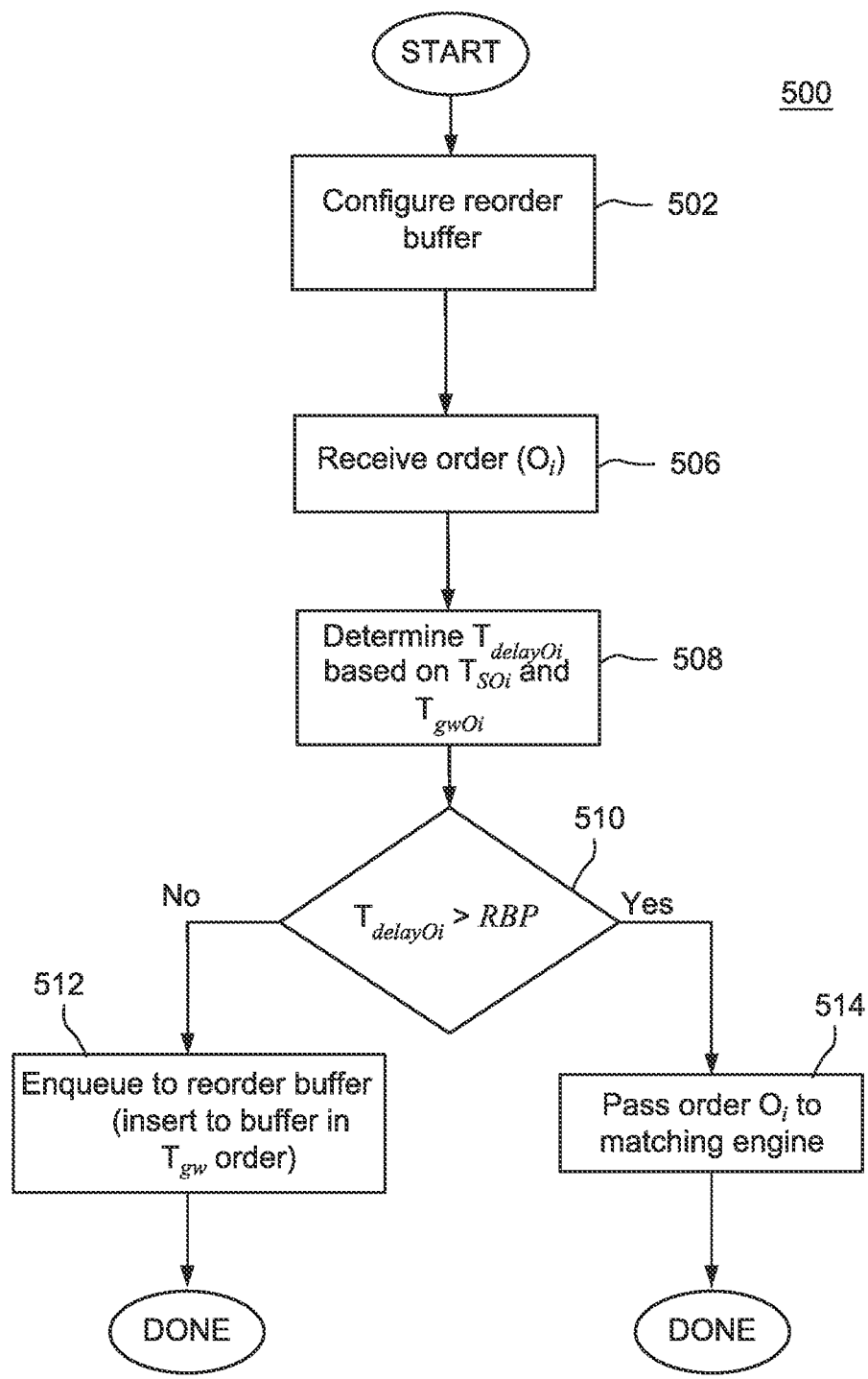
FIG. 5 is a flowchart of a re-ordering process, according to some example embodiments.
Figure 6:
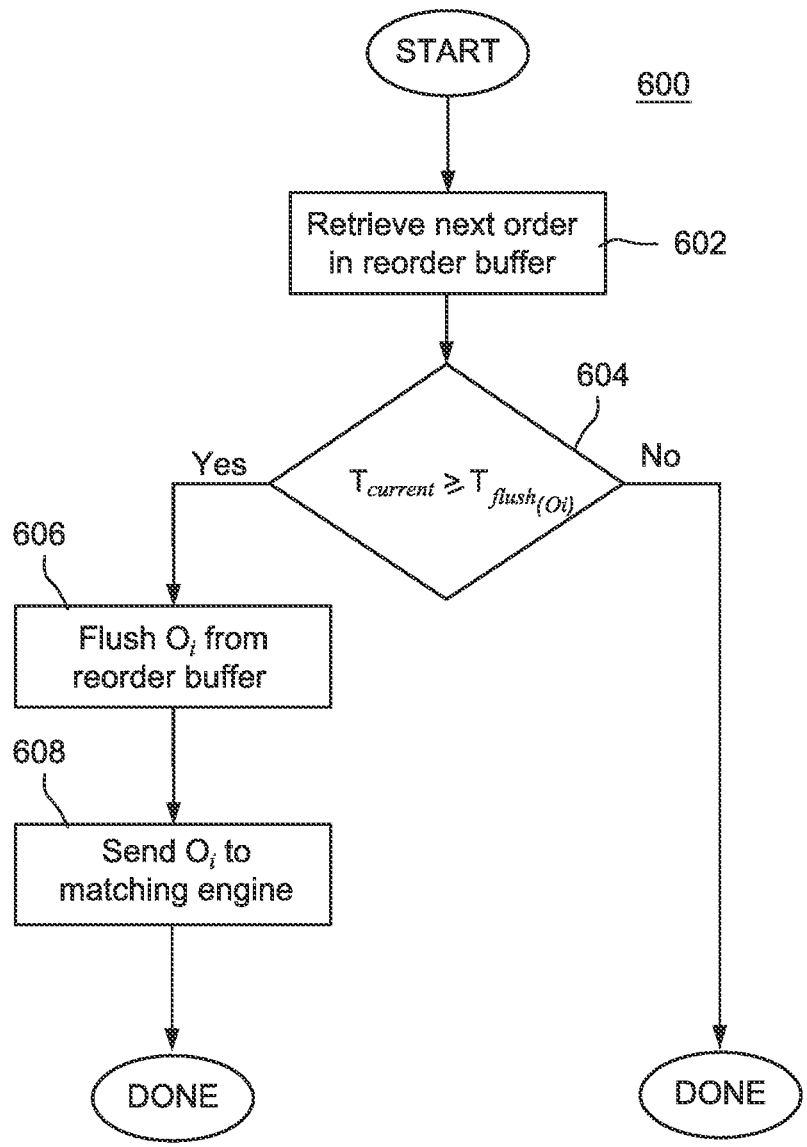
FIG. 6 illustrates a flowchart of a process to output transactions from a reorder buffer, according to some example embodiments.
Figure 7:
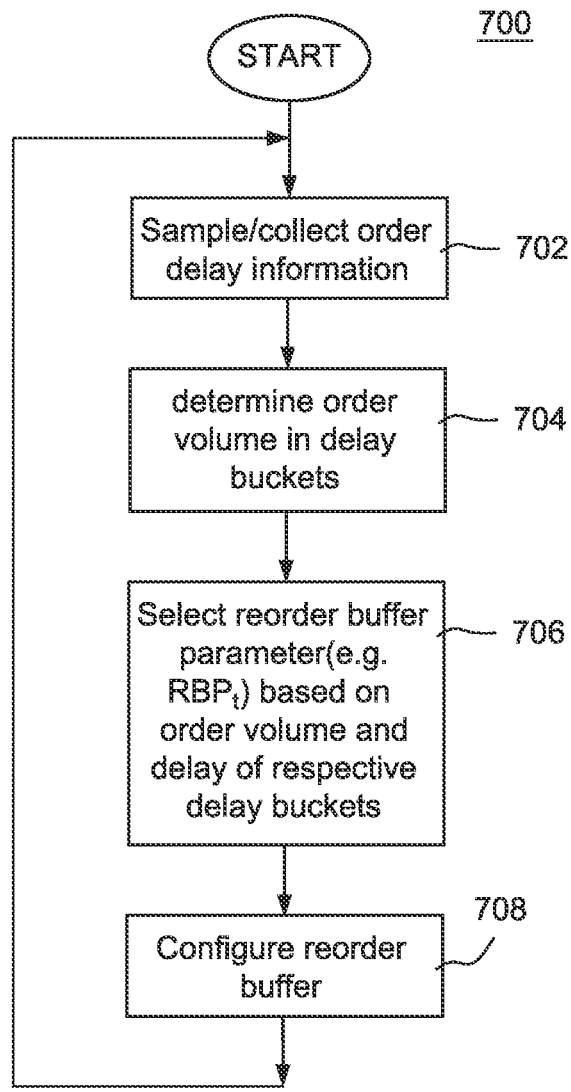
FIG. 7 illustrates is a flowchart of a process for configuring a reorder buffer, according to some example embodiments.
Figures 8A, 8B:
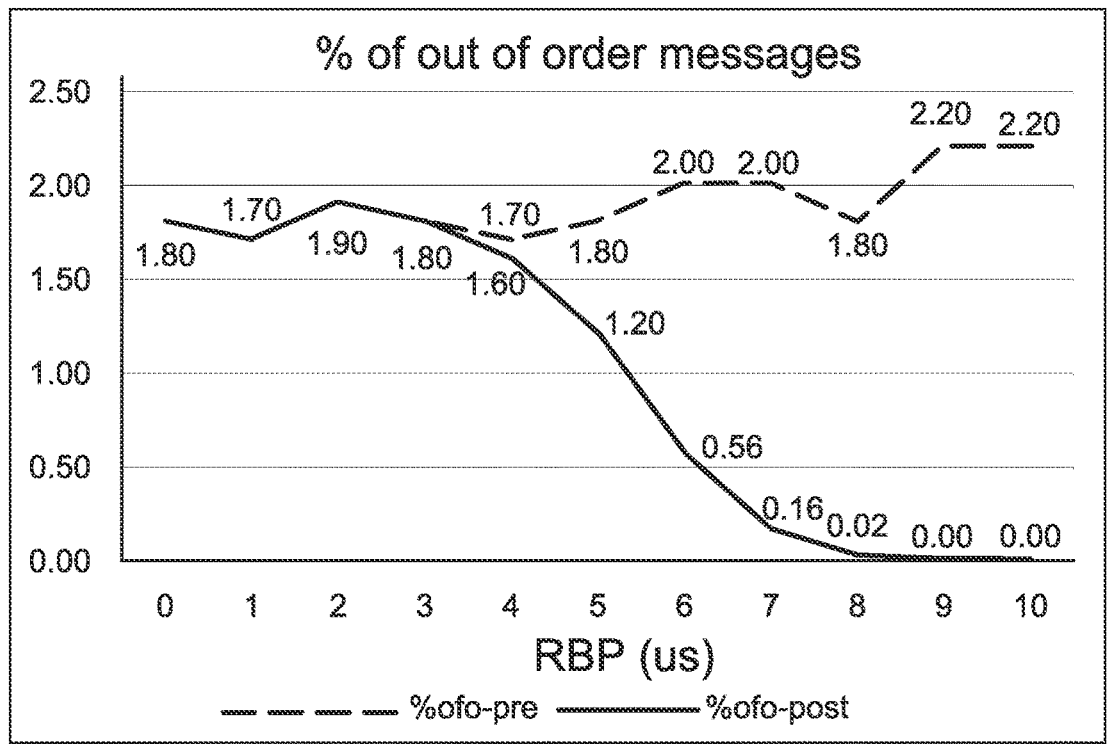
FIG. 8A provides a graph showing the change in out of order arrivals as reorder buffer configurations change, according to some example embodiments.
FIG. 8B shows the data used for the graph in FIG. 8A in another form.
Figure 9A:
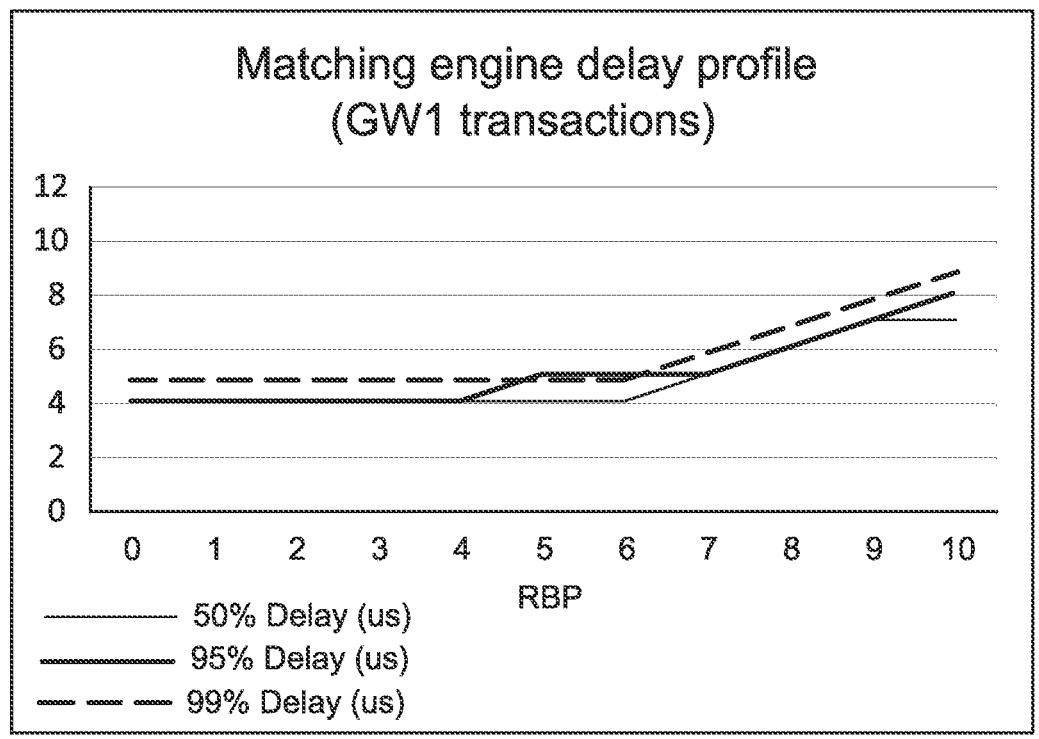
FIGS. 9A and 9B illustrate changes in delay profiles for transactions that enter the network via respective gateways and related effects of the reorder buffer, in accordance with some example embodiments.
Figure 9B:
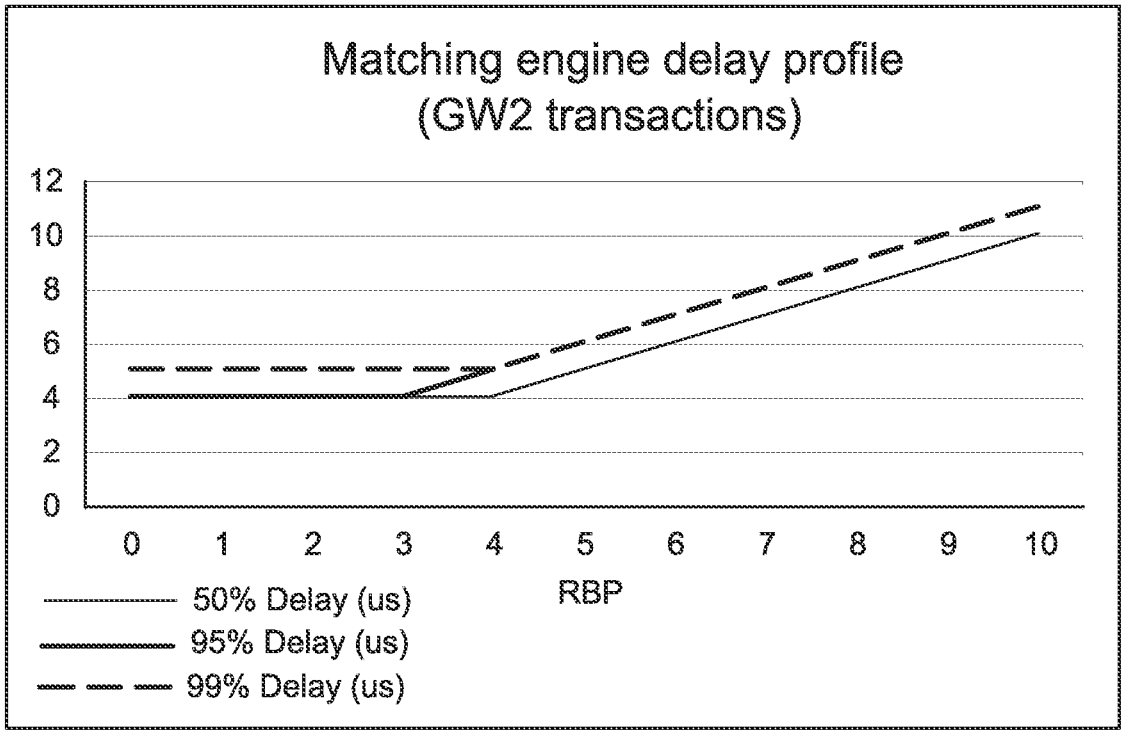
Figure 10:
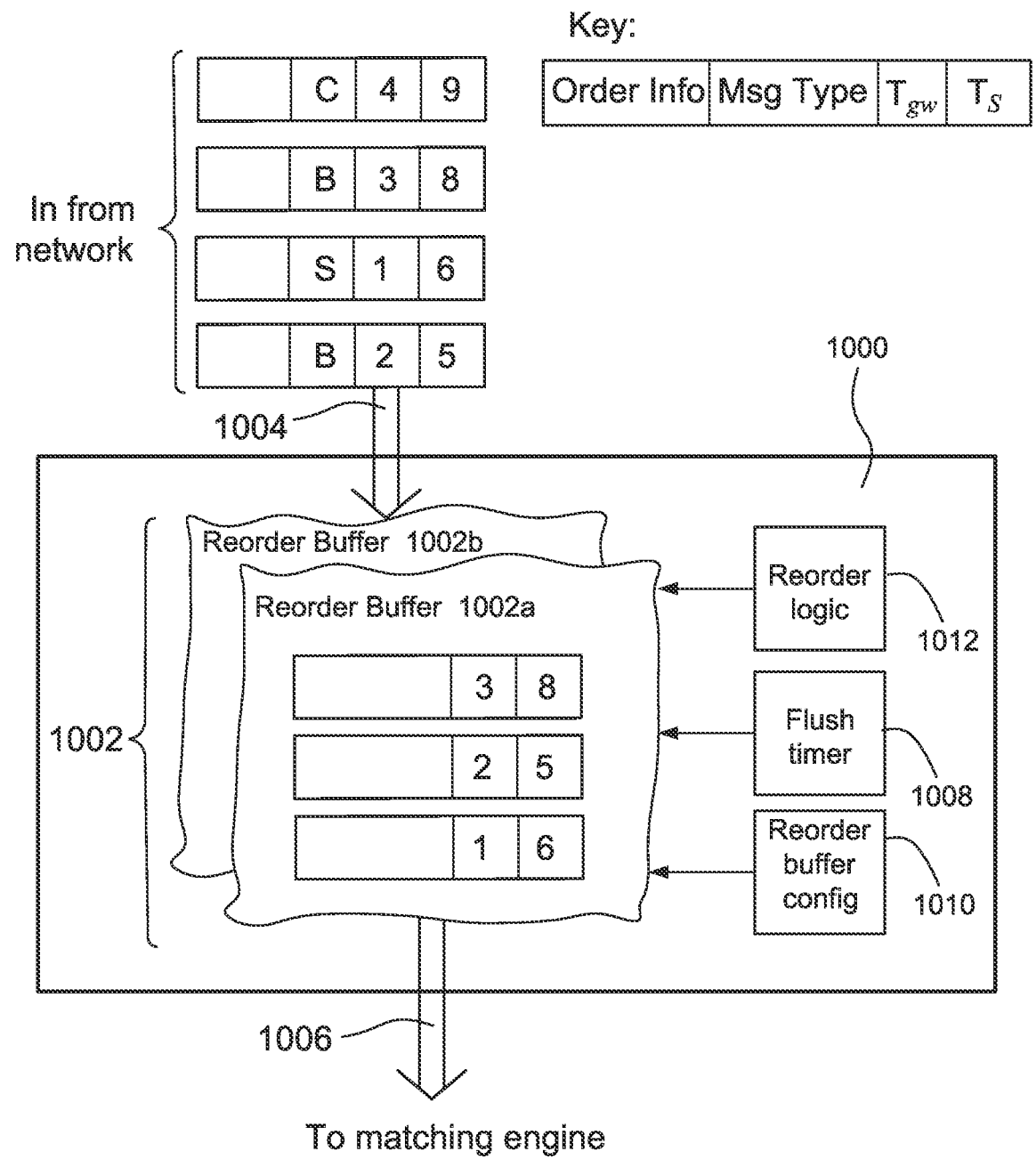
FIG. 10 illustrates an example re-order buffer having two separate reorder buffers, according to some example embodiments.
Figure 11:
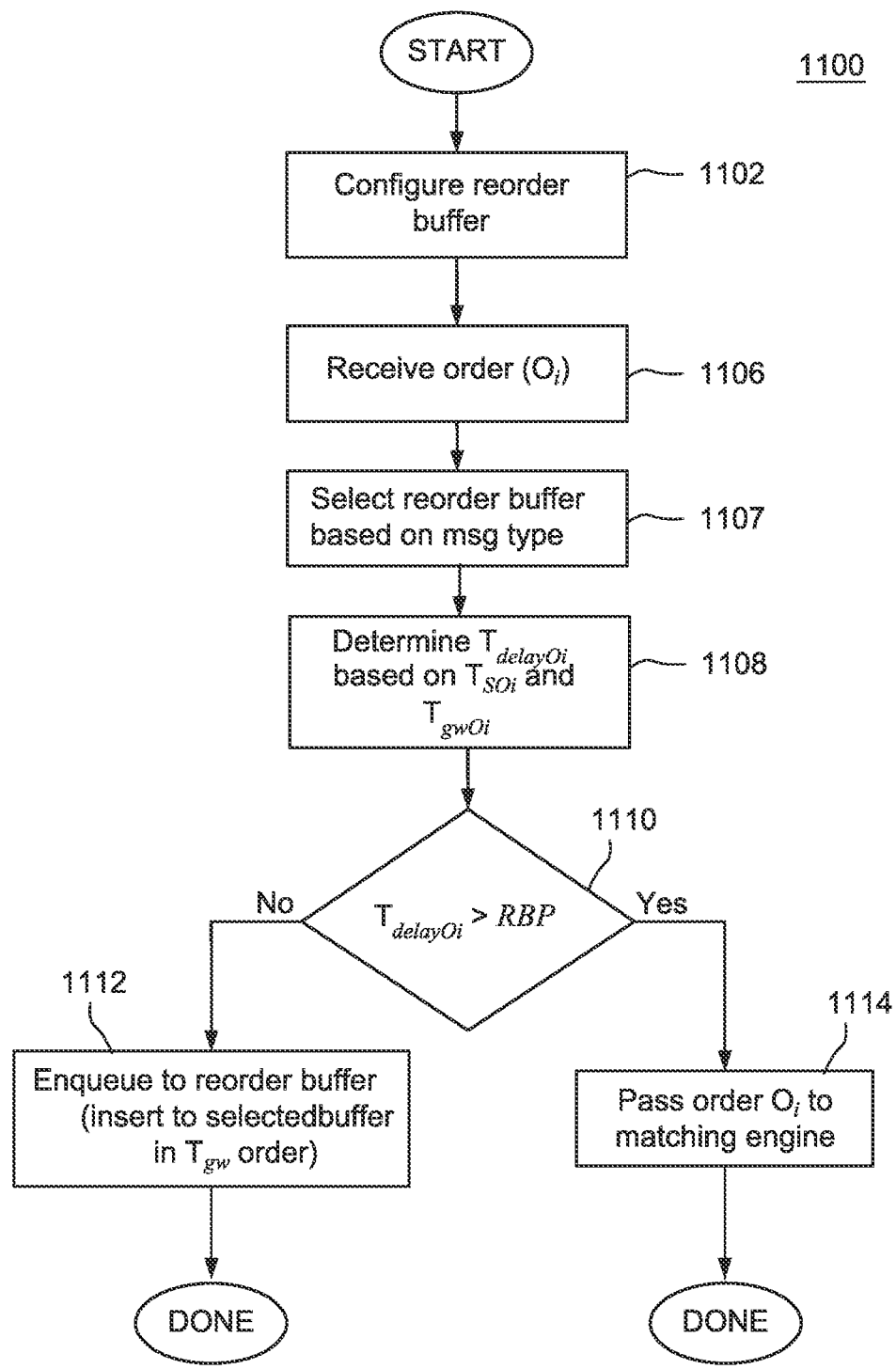
FIG. 11 is a flowchart of a re-ordering process using the two reorder buffers as in FIG. 10 and a message type, according to some example embodiments.
Figure 12:
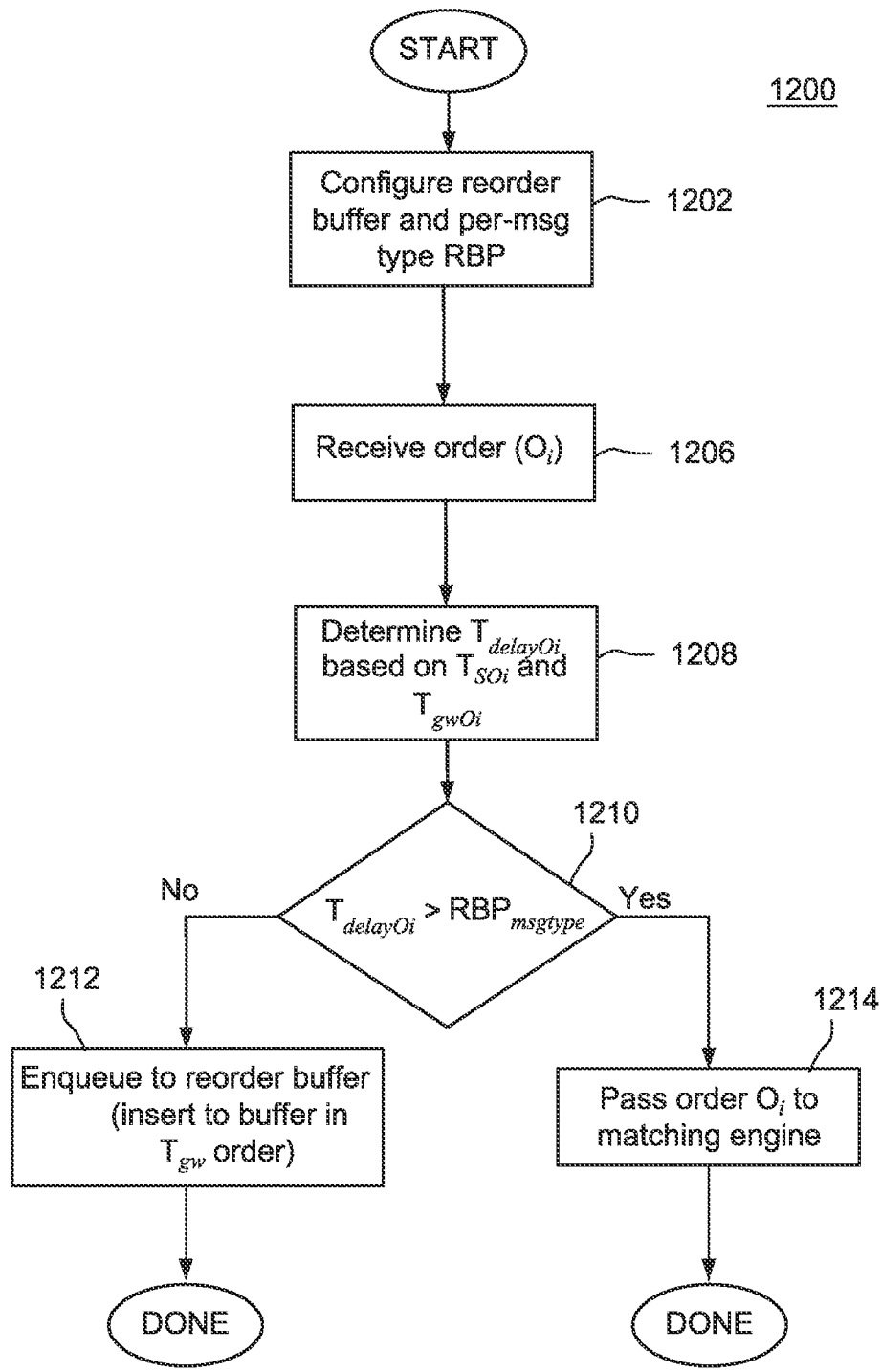
FIG. 12 is a flowchart of a re-ordering process using a message type and per-message type time interval threshold, according to some example embodiments.
Figure 13:
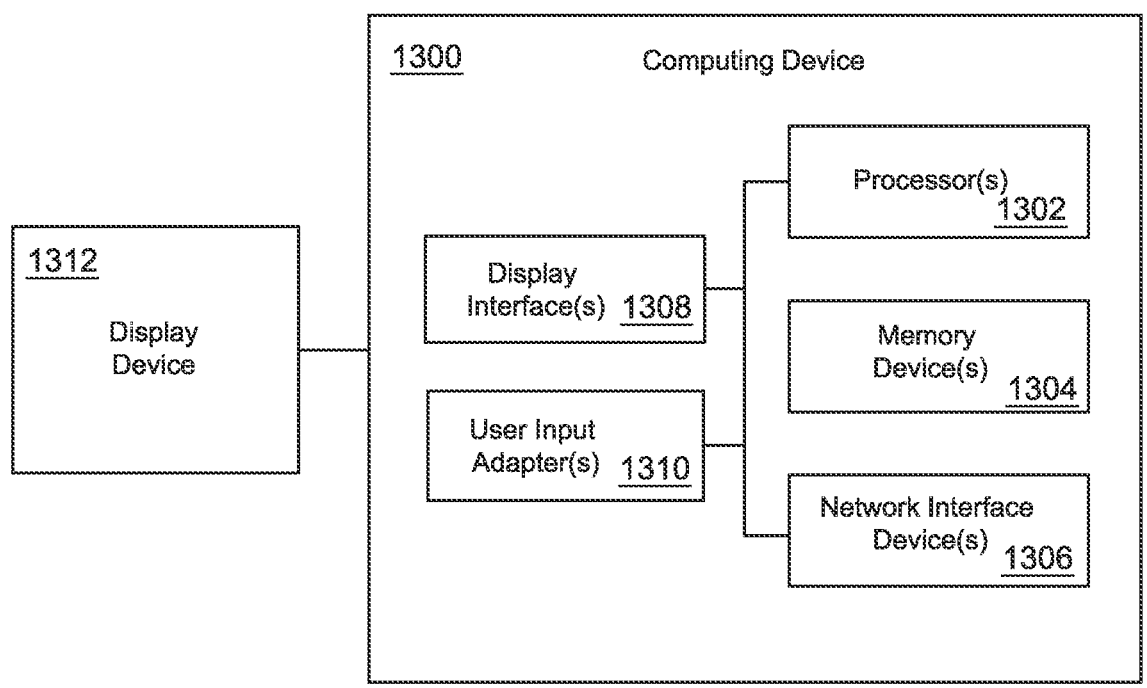
FIG. 13 schematically illustrates a computer that can be used to implement the re-ordering framework, according to some example embodiments.

FIG. 1 illustrates computer environments including a network of an electronic trading system, and client systems that connect to the electronic trading system's network. FIG. 1 also illustrates, in the electronic trading system's network, gateways at which orders received from client systems are timestamped with either a gateway timestamp or an edge switch timestamp upon entry into the electronic trading system network and the server which receives the orders from the gateways and provides them to the matching engine for processing. Embodiments use a reorder buffer for reordering client transactions to be in the order they were received by the electronic trading system network. FIG. 2A illustrates an embodiment in which the reorder buffer is implemented at the server running the electronic trading application and/or matching engine, and FIG. 2B illustrates an embodiment in which the reorder buffer is distributed among the server and the gateways at the edges of the electronic trading system network. FIG. 3 illustrates an example order at different stages of timestamping during its traversal of the electronic trading system network to the server. FIG. 4 illustrates a schematic view of a reorder buffer, such as that implemented, for example, at the server. FIG. 5 provides a flowchart of a process for reordering client transactions using a reorder buffer according to example embodiments. In an example implementation, trade orders that arrive at the server process (and are thus in a server timestamp order as shown in FIG. 4) are rearranged by the process shown in FIG. 5 to be in order of the respective gateway timestamps before they are input to the matching engine. FIG. 6 provides a flowchart illustrating the time-based residency of client orders in the reorder buffer. FIG. 7 illustrates a process for configuring the reorder buffer. FIGS. 8A and 8B illustrate the tradeoff between the tolerance of the systems to out of order client transactions and the tolerance of the system to delay. FIGS. 9A and 9B illustrate the tradeoff between the delay and the dimensions of the reorder buffer. FIG. 10 illustrates an embodiment with more than one reorder buffer for reordering respectively different types of client transactions. FIG. 11 shows a re-ordering process using the two reorder buffers as in FIG. 10 and a message type. FIG. 12 shows a re-ordering process using a message type and per-message type time interval threshold. FIG. 13 shows a computer system that can include the servers and/or gateways of the electronic trading system.

Most of the embodiments described in detail relate to electronic trading. However, although real-time electronic trading of investment instruments which relies upon split second price fluctuations etc., may use the teachings in this disclosure with particular advantage to hide effects of jitter and reduce out of order arrivals at the electronic trading application, embodiments are not limited to such environments or applications.

Description of FIG. 1

Figure 1A:
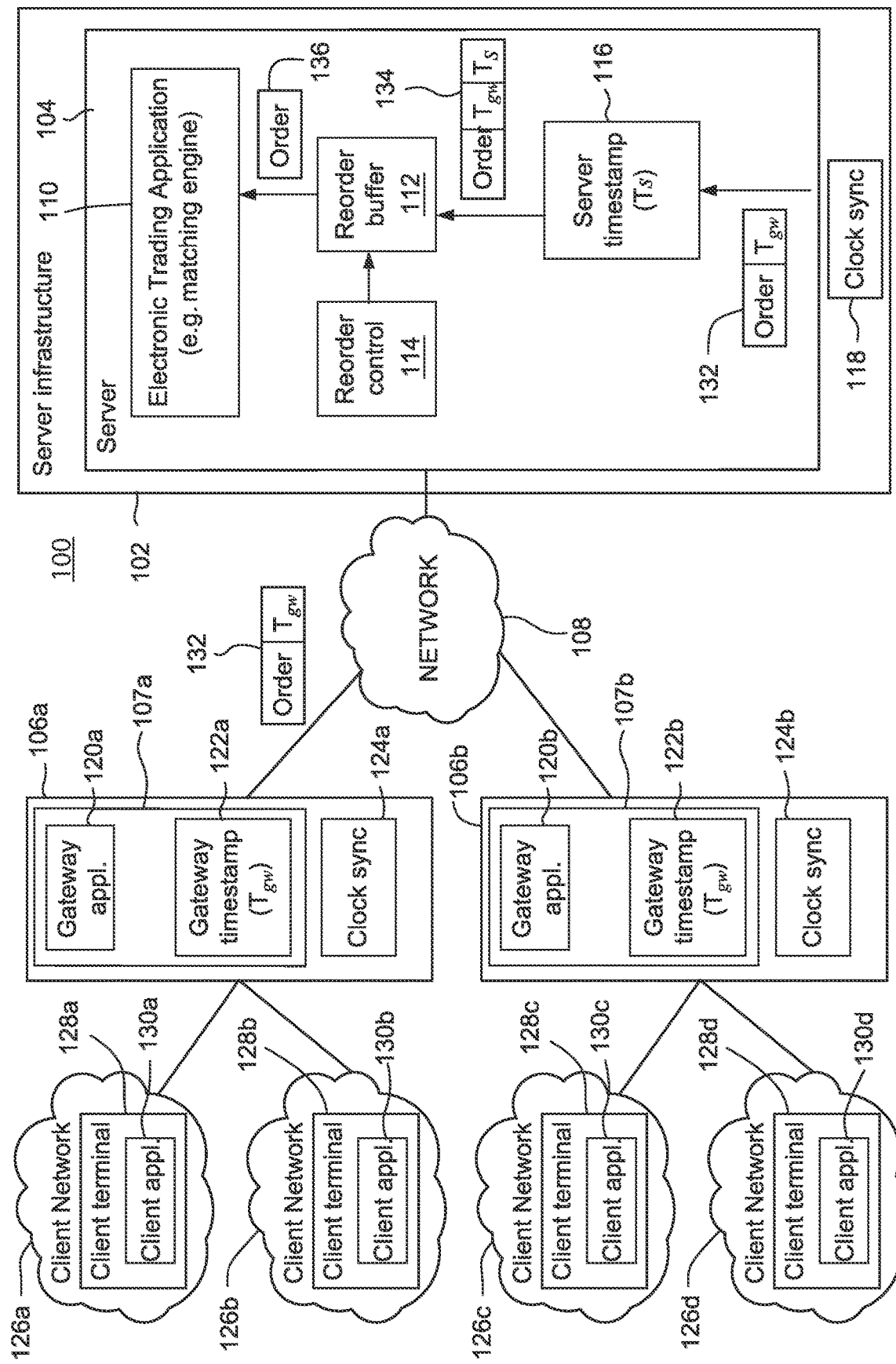
FIG. 1A and FIG. 1B (collectively referred to as FIG. 1) illustrate example computing environments in which a transaction re-order framework is used to alleviate effects of network communication characteristics such as jitter on order re-ordering, according to some example embodiments.

FIG. 1A illustrates a computing environment in accordance with certain example embodiments. The non-limiting computing environment 100 includes an electronic trading system and client systems that connect to the electronic trading system. FIG. 1 also illustrates, in the electronic trading system's network, gateways at which trade orders (also referred to as transactions or orders) received from client systems are timestamped upon entry into the electronic trading system network, and the server which receives the trade orders from the gateways and provides them to the matching engine of an electronic trading application for processing.

The electronic trading system includes one or more servers 104 in server infrastructure 102 and one or more gateway infrastructure systems 106 (e.g. gateway infrastructure systems 106a and 106b) that are connected to the server infrastructure 102 by a communication network (also referred to as "communication infrastructure") 108. Servers 104 in server infrastructure 102 may communicate with gateways 107 (e.g., gateways 107a and 107b) in gateway infrastructure systems 106 and client devices 128 (e.g., client terminals 128a, 128b, 128c and 128d) via the gateways, so that users on client terminals 128 can interact with an electronic trading application 110 (which may include a matching engine) executing in server infrastructure 102. The users may each use a respective client application 130 (e.g., client applications 130a, 130b, 130c and 130d) executing on their own terminal 128 to interact with the electronic trading application 110 via gateways.

The example computing environment 100 provides for electronic trading of investment instruments such as, for example, equities, derivatives, or other financial or commodity instruments by executing the trading application 110 in server infrastructure 102. At least in some embodiments, the trading application 110 may provide for real-time electronic trading in which the trade of at least some types of trades are attempted on an ongoing real-time basis. For example, each trade order (e.g., buy order or sell order) in a stream of incoming trade orders from client devices 128a-128d and/or gateway systems 106 is immediately (e.g., in real-time or near real-time without any intervening non-essential activity) upon receipt compared against an order book to determine a match. Example embodiments are configured to use data structures and matching techniques, and the like, that can efficiently process tradable instrument records in large volumes (e.g., hundreds or thousands of orders per second) and in real-time time constraints (e.g., process the majority of incoming orders within 1 second). The matching process is performed by an application component usually referred to as a "matching engine". The server infrastructure 102 may also operate to perform other associated tasks such as updating inventory records, and notifying other systems regarding the executed trades so that the delivery etc. can be tracked. One or more of an order book server, a trade management server, a position management server, and a fulfillment management server may be included, or may interact with, the trading application 116 to provide the electronic trading functionality on the server infrastructure 102.

The electronic trading application 110, or a matching engine which is a part of the trading application 110, may operate to match each incoming order with orders from the order book database (also referred to as "standing orders database"). For example, the matching engine may operate to match an incoming buy order with one or more sell orders stored in the order book database, or to match an incoming sell order with one or more buy orders stored in the order book database. The matching may be performed in accordance with one or more predetermined or dynamically determined matching rules from a matching rules database. In some example embodiments, one or more of the servers may provide an interface (e.g., an application programming interface—API) which can be used by other servers in server infrastructure 102 and/or external computers to interact with it. For example, one or both of the order matching engine and order book server, which are used in the real-time order matching process, may communicate with each of the other servers in server infrastructure 102 and/or external computers via APIs.

The capability of the server infrastructure 102 to process incoming orders at high speeds (e.g., several thousand or several hundred thousand matches a second) so that the matching process can be relied upon to strictly honor the time ordering in which the respective orders are received and to process orders in a minimum time interval after the order has been transmitted by the user, are very important and may underpin the accuracy and validity of trades made on the system.

Server infrastructure 102 may include one or more physical server computers (e.g., server 104) that are communicatively connected to each other over a network and/or point-to-point connections. The physical server computers may be geographically co-located or distributed. The interconnection between servers in server infrastructure 102 may be via the Internet or over some other network such as a local area network, a wide area network or point-to-point connections (not separately shown) with each other. In some embodiments, multiple servers are interconnected with high speed point-to-point connections and/or a high speed broadcast bus. Each server 104 includes a processing system having at least one uni- or multi-core processor and includes system software. In some embodiments, each server 104 may correspond to a processing unit in a Symmetric Multiprocessor (SMP). In some embodiments, each server 104 may be standalone computer interconnected to one or more other computers with a high speed connection. In some embodiments, server 104 corresponds to a server process running on one or more physical computers.

The system software may include the operating system for server 104, and may provide system calls etc., by which applications such as electronic trading application 110 can request services from the operating system to control the processor(s) and/or peripheral devices. System software may also provide for inter-process communication between processes and/or threads executing on the same or different processors/processor cores, and may also provide for communication between separate computers over one or more network interfaces. Thus, system software provides for the electronic trading application 110 to access system resources (e.g., processors, processor cores, memory, communication interfaces, memory pipes, etc.) in order to perform intra-process, inter-process, inter-thread, and inter-host communication as necessary.

According to certain embodiments, the electronic trading application 110 comprises, or operates as, a matching engine that matches incoming client orders with inventory in an order book. According to certain other embodiments application 110 may be a transaction-driven application other than an electronic trading application.

Each gateway infrastructure system 106 may be located either geographically remotely from the server infrastructure 102, or locally with the server infrastructure 102. Each gateway infrastructure system 106 includes one or more gateway 107. A gateway 107 may include at least one uni- or multi-core processor and system software. The gateway 107 may run a gateway application 120 (shown as 120a and 120b in gateways 107a and 107b, respectively) that operates to aggregate and/or preliminarily process client orders before they are transmitted to the server infrastructure 102. In some embodiments, a gateway 107 corresponds to a gateway process running on or more physical computers. In some embodiments, each gateway application 120 may execute on more than one gateway 107 in a corresponding gateway infrastructure system 106. Aggregation performed by a gateway may include bundling two or more user initiated (e.g., client system originated) trade orders in one message to the server infrastructure. Preprocessing may include changing headers, authentication, and/or encryption. Gateways may, in some embodiments, perform translation of message types and/or message data between a client system and the trading system. In some embodiments, the gateway may tag one or more data transaction request messages from the client system with a message type that the server may use in the process of subjecting those data transaction request messages to reordering.

Any of the above mentioned applications may interact with an enterprise service application (not separately shown) for managing user authentication, with clients terminals 128 for receiving incoming trade orders from and for transmitting order/trade confirmations, and database management systems and/or external servers for obtaining information to be used in the processing or to report information regarding orders, trades and positions, as well as market statistics. An application, such as any on server 104, may comprise one or more client-side components and one or more server-side components. Client-side components of an application may operate to provide for handling the user interface by performing presenting (e.g., displaying) of information on a user interface device; receiving user input, etc. Server-side components may provide for authentication, service metering, generating or obtaining information to be presented to the user in accordance with received user inputs.

Example client computer systems such as client terminals 128 (e.g., terminals 128a-128d) can be configured to execute the same or different client applications 130 (e.g., applications 130a-130d). The client applications may include a client-side portion of a trading application such as the electronic trading application 110. In the illustrated example of FIG. 1, client terminal 128a is executing a client-side trading application and transmits a buy order through that client-side trading application. Client terminal 128a may execute the same or different trading application, and may transmit a sell order to server 104. Client terminals 128 may include any of personal computers, mobile computers, tablets, smartphones, and other electronic devices. In some example embodiments, any electronic computing device including at least a display, an input device for user input, and a communication interface for communicating with the server device may operate as a client device. Although two client systems are shown, any number of client systems may interact with each gateway infrastructure 106.

In example embodiments, the electronic trading system or more particularly the server infrastructure 102 and/or server 104 and gateway infrastructures 106 and/or gateways 107 include timestamping components and message reordering components that facilitate the elimination or reduction of the number of trade orders that are presented to the electronic trading application (or matching engine) 110 in an order different from the time ordering in which the respective trade orders entered the electronic trading system's network (e.g., network 208). In some embodiments, server infrastructure 102 and gateway infrastructures 106 may also include clock synchronization components that maintains the clocks associated with respective server timestamp component and gateway timestamp components, so that the respective devices are in close time synchronization with each other. Higher accuracy in the clock synchronization provides for more accurate timestamping and reordering in the electronic trading system.

The server 104 and gateways 107 each includes a respective time stamping component. The timestamp components may be implemented in hardware, in software or using a combination of hardware and software. Each timestamp component may be implemented either within or in close proximity to the respective server or gateway.

The server timestamp component 116 may reside in the server or in very close proximity to the server, and operates to timestamp each incoming trade order. In some embodiments, server timestamp component 116 may be arranged in the server 104 network interface (e.g., integrated in the network interface card NIC) or in the path of an incoming trade order immediately after the NIC, and operates to timestamp incoming trade orders with the time at which the respective orders enter the server 104. In some other example embodiments, the timestamp may represent any point in time during the interval between when the trade order enters the server or the server infrastructure and when the trade order is either forwarded to the trade application (and/or matching engine). In some embodiments, server timestamp component 116 may be located in the server infrastructure 102 but externally to the server 104, for example, in a device connecting the server 104 to network 108.

A respective gateway timestamp component 122 may be located within each gateway infrastructure 106. The gateway timestamp component 122a may be located in gateway 107a and gateway timestamp component 122b may be located in gateway 107b. In some embodiments, gateway timestamp component 122 may be arranged in the gateway 107 network interface (e.g., integrated in the gateway 107 network interface card MC) or in the path of an incoming message immediately after the NIC, and operates to timestamp incoming trade orders with the time at which the respective orders enter the respective gateway 107 (e.g., 107a or 107b). In some other example embodiments, the timestamp may represent any point in time during the interval between when the trade order enters the respective gateway and when the trade order is either forwarded to the server. In some embodiments, gateway timestamp component 122 may be located externally to the respective gateway 107, for example, in a device connecting the respective gateway 107 to network 108 (and/or to any of client networks 126 (e.g. client networks 126a, 126b, 126c, and 126d).

A clock synchronization subsystem includes a respective clock synchronization component 124 in each gateway infrastructure 106 and a clock synchronization component 118 in each server infrastructure 102. In the illustrated embodiment, a clock synchronization component 118 is located in the server infrastructure 102 and provides the time information for timestamping component 116. In the illustrated embodiment, the clock synchronization component 118 is located outside of the server 104. However it will be understood that the clock synchronization component can be located elsewhere in the server infrastructure 102, including in server 104, and be configured to provide the server timestamp component 116 with time information.

Each gateway infrastructure 106a and 106b includes a respective clock synchronization component 124a and 124b which provides time information used by the respectively corresponding gateway timestamping components 122a and 122b. In the illustrated embodiment, the clock synchronization components 124a and 124b are located outside of the respective gateways 107a and 107b. However it will be understood that the clock synchronization components 124a and 124b can be located elsewhere in the respective gateway infrastructures 106a and 106b, including in respective gateways 107a and 107b, and be configured to provide the respective gateway timestamp components 122a and 122b with time information.

Clock synchronization components 118, 124a and 124b may be synchronized according to a known distributed clock synchronization technique, and/or may be synchronized in relation to a real highly accurate clock. In some embodiments, the clocks associated with clock synchronization components 118, 124a and 124b are synchronized using the Huygens clock synchronization technique. In some embodiments, a pulse per second (PPS) strata one GPS receiver is received to synchronize clocks to within 10-100 nanoseconds.

During operation of the electronic trading system, trade orders are originated in the client terminals 128 by the client applications 130. The orders may be manually originated by a user or automatically by a program. The trade orders are then transmitted from the client networks 126 to the electronic trading system's network. One or more gateways 107 at the edge of the electronic trading network (e.g., network 108) receive the incoming trade orders from the client terminals. Each gateway 107 may timestamp each incoming trade order with the current time corresponding to the time at which the trade order was received at the gateway's network interface. Alternately, the time stamp may correspond to another point during which the trade order is in the gateway or gateway infrastructure. The timestamp provided by a gateway to a trade order is referred to as "gateway timestamp" and may be represented with $T_g w$. The gateway then, optionally after processing the trade order in a respective gateway application 120 (e.g., gateway applications 120a and 120b), transmits the trade order (which now has $T_{gw}$ attached to it) 132 to the server 104 over network 108.

The $T_{gw}$-attached trade order 132 is then received at the server 104. The server 104, using server timestamp component 116, timestamps the trade order 132 with the "server timestamp" (represented by "$T_s$") representing the current time at which the trade order entered the server 104. The $T_s$-attached trade order 134 is then provided to the electronic trading application or matching engine 110.

Before the electronic trading application or matching engine 110 receives it, the trade order 134 may be processed in a reorder buffer 112 and associated reorder control 114, so that a stream of trade orders can be arranged in order (e.g. oldest to newest) of the time each trade order entered the electronic trading application (as approximated, for example, by the respective attached $T_{gw}$). After the processing and reordering in reorder buffer 112 and/or reorder control 114 the timestamps may be removed from the respective orders and trade order 136 can be provided to the electronic trading application and matching engine 110 to be considered in a trade. The communication between the reorder buffer and the electronic trading application and/or matching engine may use one of many inter-process communication mechanisms, and in some embodiments, may include a shared memory pipe.

In this manner, the reorder buffer 112 and reorder control 114 operate to output trade orders in the time ordering in which they entered the electronic trading network (which are represented by respective $T_{gw}$) at the gateways rather than the order in which they were received at the server (which is represented by respective $T_s$), thereby enabling the matching engine and/or other components of the electronic trading application to proceed with the transaction processing with respect to received orders without incurring overhead for handling out of order trade orders.

It should be understood that the software modules shown in FIG. 1 are stored in and executed by hardware components (such as processors and memories), and it should be further understood that, whenever it is described in this document that a software module performs any action, that is done solely for ease of description, and the action is in actuality performed by the underlying hardware according to the instructions and data that comprise the software module. Further details regarding example hardware components that may be used to implement the features described herein are provided below with reference to FIG. 13, as well as in other places in this document.

Figure 1B:
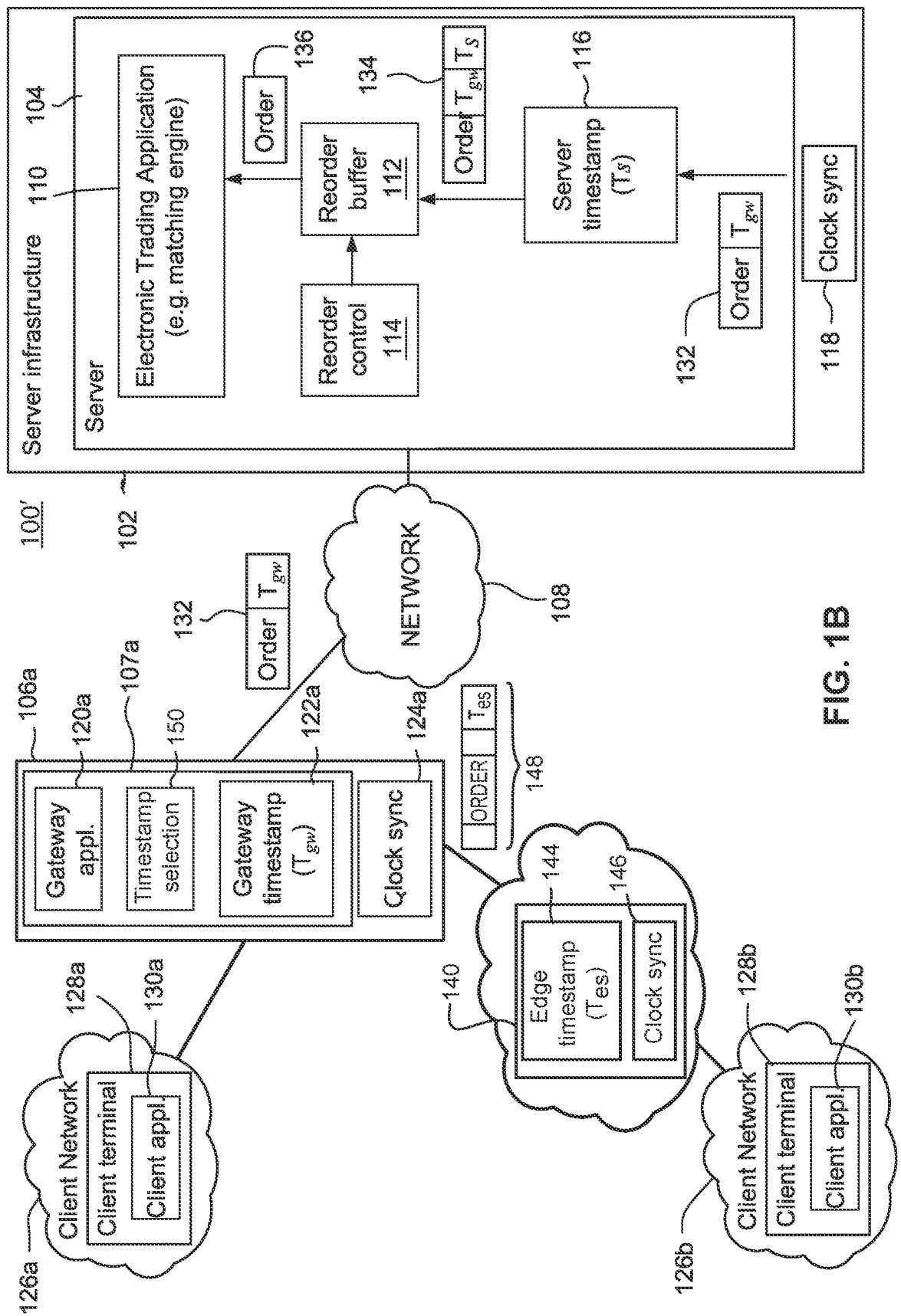

FIG. 1B illustrates another computing environment in accordance with certain example embodiments. The non-limiting computing environment 100' is identical to the environment 100 described in relation to FIG. 1A (gateway infrastructure 106b, and client networks 126b-c are not shown in FIG. 1B to avoid overcrowding the illustration) except that environment 100' additionally includes one or more edge switches that can timestamp incoming orders and at least some of the gateways include the capability to use the edge switch timestamp instead of the timestamp based on the gateway clock. For illustration, in environment 100' an edge switch 140 is shown in the network between gateway 160a and client network 126b. The edge switch 140, in some embodiments, may be located at the edge of the client network 126d, such as, for example, the client's local area network (LAN), and may be considered the outer edge of the electronic trading system's network.

An edge switch at the edge of the electronic trading system's network, such as edge switch 140, may be configured to timestamp messages that are coming in to the electronic trading system's network. In some embodiments, for example, the edge switch and/or gateway infrastructure 106a may operate to guarantee wire order delivery of incoming messages to the gateway infrastructure 106a.

The edge switch 140 includes an edge timestamp function 144, in hardware and/or software, that includes an edge timestamp $T_{es}$ with incoming messages that are forwarded by the edge switch 140 into the electronic trading system's network. In some embodiments, the edge switch 140 may not distinguish messages based on message type and may timestamp incoming messages regardless of whether they are incoming trade orders. Alternatively, in other embodiments, the edge switch may selectively timestamp incoming trade orders. In some embodiments, the edge timestamp $T_{es}$ may be included in the general frame/packet header/trailer areas. For example, in one embodiment, $T_{es}$ may be included in the Ethernet or link layer trailer. An edge switch timestamped frame or packet 148 may thus have the format in which a frame/packet header is followed by the trade order which is followed by the frame/packet trailer in which a $T_{es}$ is included.

The edge switch 140 may also include a clock sync 146 functionality that operates to synchronize its clock to that of the electronic trading system. In some embodiments, the clock sync 146 may be synchronized using the same technique as clock sync 124a and 118. In other embodiments, clock sync 146 may be synchronized with the gateway infrastructure using some other synchronizing mechanism.

The gateway infrastructure 106a in environment 100' includes a timestamp selection function 150. The timestamp selection 150 may be configured to selectively choose, for trade orders received from edge switch 140, one of either $T_{es}$ or a timestamp according to the gateway 106a's clock as the gateway timestamp $T_{gw}$. For example, in some embodiments, the gateway infrastructure 106 may be configured to use the edge timestamps assigned by edge switches as the gateway timestamp. In a further example, when the configuration according to timestamp selection 150 indicates that the edge timestamp should be used for incoming trade orders, the gateway infrastructure 106a in gateway timestamp 122a copies the $T_{es}$ from the received frame/packet containing the trade order into the $T_{gw}$ field of the order message 132 transmitted to the server infrastructure.

The configuration of whether to use $T_{es}$ as the gateway timestamp may be made so that it is the same for the entire electronic trading system network, per gateway infrastructure (or per group of gateway infrastructures), or per client network/edge switch (or per groups of client networks/edge switches).

As noted above, the operations of the gateway infrastructure and the server infrastructure in relation to the processing of order messages 132 may be identical to that in environment 100 described above in relation to FIG. 1A except for the gateway infrastructure choosing between $T_{es}$ and a timestamp according to the gateway infrastructure clock as the $T_{gw}$.

Although the edge timestamp and associated operations are shown in FIG. 1B only with respect to one edge switch 140 and one gateway infrastructure 106a, it will be understood that any number of edge switches and/or gateway infrastructures can be operational in environment 100' providing functionality similar to that described above in relation to the edge timestamp. The capability to use the edge timestamp $T_{es}$ in the reordering performed at the gateways and/or server infrastructure may provide for execution of matching operations according to more accurate estimates of when trade orders entered the electronic trading system's network.

In many places in this document, including but not limited to in the above description of FIG. 1, software modules and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 13.

Description of FIGS. 2A and 2B

FIG. 2A illustrates an arrangement of an electronic trading server 202 and gateways 204 (e.g., GW 1, GW 2 ... GW N) of a corporate network 208 with a reorder buffer 210 in, or in close proximity to, the server 202, according to an example embodiment. In the system shown in FIG. 2A, client systems 206 (e.g., client 1, client 2, ..., client M) generate and transmit trade orders to gateways 204. Each gateway 204, which may be considered an entry point to the electronic trading system, attaches a respective gateway timestamp to a trade order, and transmits the gateway timestamp-attached trade order to the electronic trading server 202 over the network 208. The network 208 may cause respective trade orders to experience different latencies in reaching the server 202, and the trade orders, when reaching the server 202, may not be in the order in which they entered the electronic trading system at the gateways. A gateway timestamp-attached trade order is received in the reorder buffer 210, which, possibly in association with a reorder logic (not shown), which reorders a stream of gateway timestamp-attached trade orders to be in accordance with when they entered the electronic trading system (e.g., at the gateway) before the respective trade orders are provided to the matching engine in server 202.

FIG. 2B illustrates another arrangement of an electronic trading server 202 and gateways 204 (e.g., GW 1, GW 2 ... GW N) of a corporate network 208 with a reorder buffer 210 in or in close proximity to the server 202, and in addition, a second reorder buffer 212 arranged at each gateway 204, according to an example embodiment. In the system shown in FIG. 2B, client systems 206 (e.g., client 1, client 2, ..., client M) generate and transmit trade orders to gateways 204. Each gateway 204 attaches a respective gateway timestamp to an order, and transmits the gateway timestamp-attached trade order to the electronic trading server 202 over the network 208. However, before transmitting the orders to the server, each gateway may reorder the trade orders in a respective second reorder buffer 212. The second reorder buffer 212 may be located at the entry port to the electronic trading system's network (e.g., the port connecting the gateway to the electronic trading system's network). The reordering at a gateway may ensure that trade orders received from different client networks and/or systems over one or more network interfaces at the gateway are transmitted to the server in the time sequencing in which they were received at the gateway, and may also minimize jitter upon entry of those trade orders to the electronic trading system's network. The reordering at each gateway may also help avoid orders becoming out of order due to different paths followed in any processing performed followed in the gateway. The network 208 may cause respective orders to experience different latencies in reaching the server 202, and the orders, when reaching the server 202, may not be in the order in which they entered the network 208 at the gateways. A gateway timestamp-attached order is received in the reorder buffer 210, which, possibly in association with a reorder logic (not shown), reorders a stream of gateway timestamp-attached orders to be in accordance with the times they entered the network 208 before the respective orders are provided to the matching engine in server 202.

Description of FIG. 3

FIG. 3 schematically illustrates order data structures (with these order data structures also being referred to as "messages," "transaction messages," or "data transaction request messages"), according to some example embodiments. Order info 304 may represent the trade order information that is generated by a client application (e.g., such as client application 130a) and/or subsequently received by the matching engine (e.g., electronic trading application and/or matching engine 110).

After the gateway timestamp component (e.g., gateway timestamp component 122a) processes a trade order by timestamping (either using the gateway's own synchronized clock as described in relation to FIG. 1A or using the timestamp provided by an edge switch as described in relation to FIG. 1B), the gateway timestamp-attached trade order (e.g., order 132) may have a structure 302 comprising the order information 304, a message type indicator 305, and gateway timestamp ($T_{gw}$) 306. The structure 302 may include a placeholder 308 for subsequently including a server timestamp. In the gateway timestamp-attached trade order, the placeholder 308 may be set to null or a known constant value.

Order data structure 310 shows a gateway timestamp-attached trade order (e.g., structure 302) after it is time-stamped at the server, producing a server timestamp-attached trade order which, in addition to order information 304, message type 305, and $T_{gw}$ 306, also includes server timestamp ($T_s$) in placeholder 308.

Order data structure 312 schematically illustrates an order data structure 314 encapsulated in a transport protocol header 316 and a network protocol header 318, as could be the case when the order information is traversing the network between a gateway and the server. The order data structure 314 may include the gateway timestamp-attached trade order 302. According to some embodiments, the transport header may include a protocol header such as a TCP or UDP header, and the network header may include a header such as an Internet Protocol (IP) header.

It will be understood that the message type 305 may not be present in structures 302, 310 and 312 in some embodiments. For example, in some embodiments in which trade order reordering is not affected by a message type (e.g., message types buy order, sell order, cancel order, modify order, etc.), such a field in structures 302, 310 and 312 may not be required. It will also be understood that order information 304 may include order information provided by the client application and/or client's order-related information (e.g., internally-assigned account ID for client) as provided by the gateway or gateway application.

In this description, the terms "server timestamp-attached", "$T_s$-attached", "gateway timestamp-attached" and "$T_{gw}$-attached" all refer to including a timestamp with a trade order. In the examples shown in FIG. 3, the respective timestamps are included in corresponding trade order data structures by writing the timestamps in fields of those data structures. It will, however, be understood that there may be other ways of including a timestamp with a trade order that are consistent with the teaching in this disclosure.

Description of FIG. 4

FIG. 4 is a schematic illustration of a reorder buffer, according to some example embodiments. According to an embodiment, reorder buffer 402 may correspond to reorder buffer 112 shown in FIG. 1, and the reorder components 408-412 may correspond to reorder control 114 shown in FIG. 1.

A reorder buffer 402 may receive as input a stream of trade orders 404, each input trade order including a gateway timestamp $T_{gw}$ and a server timestamp $T_s$. As described above, the $T_{gw}$ attached to a particular trade order may represent the time that the trade order entered a gateway of the electronic trading system. That is, $T_{gw}$ may be considered as the time the trade order was received in the electronic trading system. The $T_s$ represents the time at which the particular order was received at the server hosting the electronic trading application and/or the matching engine.

The incoming server timetamped orders 404 are input to the reorder buffer 402 and arranged by reorder logic 412. Reorder logic 412 operates to perform any processing necessary to ensure that the trade orders in the reorder buffer are subsequently output 406 in the order in which they were received at a gateway at the edge (e.g., at the order entry port) of the electronic trading network rather than in the order in which they were received at the server (e.g., in $T_{gw}$ order rather than in $T_s$ order).

In the illustrated example, the trade orders 404 that are input to the reorder buffer 402 arrive with server timestamps 5, 6 and 8, respectively, which may represent that they were received at the server at 5 seconds, 6 seconds, and 8 seconds, according to the server's clock used for the timestamping. As noted above the clocks used for timestamping may be synchronized among the participating server and gateways.

The trade order stream 404, however, have corresponding gateway timestamps of 2 seconds, 1 second and 3 second. Thus, the trade order (i.e. trade order with $T_{gw}$=2 and $T_s$=5) which is second in gateway timestamp order is received at the server before the one (i.e. trade order with $T_{gw}$=1 and $T_s$=6) which is first in gateway timestamp time sequence.

Reorder logic 412 operates, for example, by processing the orders according to process 500 described in relation to FIG. 5 below, to rearrange the trade orders 404 in the buffer 402 according to $T_{gw}$. Thus, although a stream of server timestamp-attached trade orders arrive at the input to a reorder buffer 402 in the time order corresponding to $T_s$, they are arranged in the buffer according to the $T_{gw}$ order. The arrangement according to $T_{gw}$ order may be achieved by consistently inserting incoming trade orders so as to maintain the buffer in $T_{gw}$ order. When subsequently output, for example, to the matching engine or another component of the electronic trading application, therefore, the trade orders 406 are output in order (e.g. earliest to latest) of $T_{gw}$. That is, the trade orders from the reorder buffer are provided to the matching engine in the order in which they entered the electronic trading system.

A flush timer 408 may include a timer and associated logic. The flush timer 408 operates, for example, using a process such as the process 600 described below in relation to FIG. 6, to ensure that respective packets are flushed (output) from the reorder buffer at a time determined based upon one or more of the packet's $T_{gw}$ or $T_s$. In order to correctly flush trade orders from the reorder buffer, each trade order may be associated at time of its entry into the reorder buffer with the time at which it is to be flushed.

The operations described above, yields a reorder buffer 402 which receives trade orders in $T_s$ order and outputs them in $T_{gw}$ order.

A reorder buffer configuration logic 410 may operate to configure the reorder buffer. In some embodiments, the reorder buffer may be configured with respect to the size (e.g., maximum number of trade orders that can be held simultaneously) and/or to a maximum delay. The configuration may be static, or in some embodiments, may be dynamically adapted to the load observed at the server. According to some embodiments, the reorder buffer configuration component 410 may operate according to a process such as process 700 described below in relation to FIG. 7.

In some example embodiments, the reorder unit 400 including one or more of the reorder buffer 402, reorder logic 412, flush timer 408 and reorder buffer configuration 410 in a field programmable gate array (FPGA) or like hardware circuitry. However, it will be understood that these components can be implemented with software, hardware or a combination thereof. Trade order input to the reorder buffer and trade order output from the buffer may be via an inter-process communication such as shared memory pipe or the like.

Description of FIG. 5

FIG. 5 is a flowchart of a re-ordering process 500, according to some example embodiments. In some embodiments, process 500 may be performed by reorder control 114 (and/or reorder logic 412 and reorder buffer configuration logic 410) for processing orders incoming to the server in order to populate the reorder buffer.

After process 500 is entered, at operation 502, the reorder buffer is configured. For example, the reorder buffer 112 may be configured to have a predetermined size and/or a maximum delay. After the reorder buffer is configured the electronic trading application and/or matching engine is ready to process incoming trade orders.

At operation 506, a trade order $O_i$ is received at the server.

At operation 508, a delay (or latency) associated with the trade order $O_i$ is determined based on the gateway timestamp and the server timestamp that are attached to the trade order. According to an embodiment, the delay of the trade order $T_{delay}$ is determined as $T_{delay}=T_s-T_{gw}$. Since the gateway clocks and server clock are synchronized, and there is some latency in traversing the network from a gateway to the server, generally $T_s > T_{gw}$. If, due to a badly synchronized clock $T_{gw} > T_s$ (i.e., $T_{delay} < 0$), then $T_{delay}$ is set to 0.

At operation 510, the determined $T_{delay}$ is compared to a configured reorder buffer parameter (RBP). RBP is a configuration parameter which may be set either statically (e.g., at startup, or periodic manual reconfiguration) or dynamically (e.g., automatically in response to load conditions). Configuring RBP is described in relation to FIG. 7. At operation 510 the test $T_{delay} > RBP$ is performed. That is, it is tested whether a trade order i (e.g., the trade order currently being considered) has already exceeded a maximum delay threshold for trade orders in the electronic trading system.

The test at operation 510 also enables the following to be determined for a trade transaction: $T_{RB} = \max(RBP - T_{delay}, 0)$, where $T_{RB}$ is the delay to be imposed on the trade order by enqueuing it to the reorder buffer. That is, if the trade order has experienced a "low" delay in traversing the network from a gateway to the server (i.e., $T_{delay} <= RBP$), then the trade order is held for longer (e.g., as calculated TRB) in the reorder buffer; and, if the trade order has experienced a "high" delay in traversing the network from a gateway to the server (i.e., $T_{delay} > RBP$), then the trade order is provided to electronic trading application and/or matching engine without initially buffering the trade order in the reorder buffer.

If it is determined at operation 510 that $T_{delay} > RBP$ is true, then, at operation 514, the trade order is passed to the electronic trading application and/or matching engine without first being input to the reorder buffer.

If it is determined at operation 510 that $T_{delay} > RBP$ is false, then, at operation 512, the trade order is enqueued to the reorder buffer. As described above in relation to FIG. 4, trade orders are enqueued in the reorder buffer in $T_{gw}$ sequence. Also, upon enqueuing a trade order, it may be associated with a time at which it is to be flushed (i.e. output) from the buffer. For example, a trade order for which a $T_{delay}$ is calculated may be associated with a flush time $T_{flush}$ which may be determined as $T_{flush} = T_{current} + T_{delay}$, where $T_{current}$ is the current time.

Process 500 repeats for each trade order received at the server.

Description of FIG. 6

FIG. 6 illustrates a flowchart for a flushing process 600 that outputs trade orders enqueued in the reorder buffer, according to some example embodiments. In some example embodiments process 600 may be performed by reorder control 114 (and/or flush timer logic 408 and reorder buffer configuration logic 410) for outputting trade orders from the reorder buffer.

After entering process 600, at operation 602, the next trade order in the reorder buffer is accessed.

At operation 604, it is determined whether the current time $T_{current}$ is equal to or greater than the configured flush time for the accessed trade order. That is, the test $T_{current} >= T_{flushi}$ is performed. As described above, a trade order is associated, at the time of enqueuing, with a time at which it is to be flushed (i.e. output) from the buffer. For example, a trade order i for which a $T_{delay}$ is calculated may be associated with a flush time $T_{flushi}$ which may be determined as $T_{flushi} = T_{current} + T_{delay}$, where $T_{current}$ is the current time.

If it is determined at operation 604, that the current time is less than the flush time for the trade order, then no action is to be taken with respect to this trade order. Subsequently, processing proceeds to operation 602 to repeat the process of identifying when the next enqueued trade order exceeds the corresponding flush time.

If it is determined at operation 604, that the current time greater than or equal to the flush time for the trade order, then at operation 606, the trade order is flushed (output) from the reorder buffer.

At operation 608, the trade order is provided to the electronic trading application and/or matching engine.

Process 600 repeats for each item in the reorder buffer.

Description of FIG. 7

FIG. 7 illustrates a flowchart of a process 700 for configuring a reorder buffer, according to some example embodiments. The reorder buffer may be a reorder buffer such as reorder buffer 112. The configuration may be performed by a module such as reorder control 114 (or reorder configuration 410).

After entering process 700, at operation 702-704, incoming trade orders are sampled and a plurality of counters are used to count the volume of trade orders in each of several delay buckets (e.g., each bucket corresponding to a respective interval of delay values).

At operation 706, the reorder buffer parameter (RBP) is determined based on collected trade order information.

For example, the delay statistics collected in the counters at operation 704 can be used to determine the spread and the statistical variability of $T_{delay}$. Then, RBP may be selected from the high percentiles of $T_{delay}$ in order to cover the spread and maximally restore time sequence ordering. When RBP is selected in this manner, then (e.g., by operation of process 500 above) the reorder buffer (e.g. and/or reorder control 114) can rearrange trade orders with $T_{delay} < RBP$, but will pass through trade orders with $T_{delay} > RBP$.

In one embodiment, the spread of $T_{delay}$ can be determined by initially (1) synchronizing the gateway and server clocks using a distributed clock synchronization technique (e.g., Huygens clock synchronization), (2) collecting timestamp information from a large sample of trade orders on the electronic trading system network (e.g., as described above in relation to operation 704), and (3) calculating $T_{delay}$ for the collected trade orders. After the initial collection of timestamp information and calculation of $T_{delay}$ information, RBP can be determined to obtain a balance between the percentage of out of order trade orders that can be tolerated in the electronic trading system, and the resulting extra delay introduced by the reorder buffer. As RBP becomes larger, the reorder buffer will operate to reorder a larger portion of the arriving out of order trade orders, while simultaneously imposing a longer delay on arriving trade orders before they are provided to the electronic trading application.

The RBP can be determined as described in the above paragraph, either for setting it manually (e.g. at initial startup and/or periodic manual reconfiguration), or to dynamically adapt the RBP (and thus the reorder buffer) to load conditions. The dynamic reconfiguration can be automatically run periodically at regular intervals, or when load conditions are detected to exceed certain preset thresholds. The dynamic reconfiguration may also be triggered when a new gateway is added to the electronic trading system, for example, to determine whether RBP should be adjusted if the new gateway experiences a delay level that is different than other gateways. Having the RBP configured according to a feedback loop enables the network to adapt to dynamic changes in the load (e.g. changes in volume or mix of incoming trade order traffic) and to changes in configuration (e.g., addition or removal of gateways and/or client networks connected to the gateways).

At operation 708, the reorder buffer is reconfigured according to the determined parameters. As described above, the reconfiguration may include setting a value for RBP (which is used by process 500 on an ongoing basis to process arriving trade orders at the server). In some embodiments, reconfiguration may include changing a size of the memory allocation for the reorder buffer. For example, when the RBP is lowered, the allocated memory amount may be reduced (since fewer trade orders may be buffered) allowing use of extra memory for other purposes. Likewise, when the RBP is increased, the allocated memory amount may be increased (since more trade orders may be buffered).

Description of FIGS. 8A and 8B

FIG. 8A illustrates a graph of the percentage of out of order trade orders that are observed as a function of the RBP in an example implementation of the reorder buffer, according to some example embodiments. The x-axis represents the RBP in microseconds, and the y-axis represents the percentage or out of order trade orders. The dashed line shows the percentage of out of order trade orders at a point before the reorder buffer, such as, for example, immediately after the server timestamp component and before the reorder buffer. The solid line shows the percentage of out of order trade orders after the reorder buffer, such as, for example, at the matching engine (as shown in FIG. 1).

From FIG. 8A, it can be observed that a RBP value less than 3 microsecond had no effect on reducing out of order trade orders observed at the matching engine. RBP values higher than 8 microseconds eliminated all out of order trade orders that get past the reorder buffer. Set between 3-8 microseconds, the RBP was increasingly effective in utilizing the reorder buffer to reduce the out of order trade orders that get sent to the matching engine. Thus, in summary, for the example electronic trading system shown therein, FIG. 8A illustrates that almost all out of order trade orders are reordered by the reorder buffer when the RBP is set to 8 microseconds.

FIG. 8B shows a table showing the RBP value in microseconds, the number of out of order trade orders observed before the reorder buffer as a proportion of the total number of trade orders, and the number of out of order trade orders observed after the reorder buffer as a proportion of the total number of trade orders, for the graph in FIG. 8A.

Description of FIGS. 9A and 9B

FIG. 9A illustrates an example of delays of trade orders that enter the electronic trading system's network through a first gateway as observed at the matching engine, in accordance with some example embodiments. FIG. 9B illustrates an example of delays of trade orders that enter the electronic trading system's network through a second gateway as observed at the matching engine, in accordance with some example embodiments.

Each graph illustrates a 50% delay profile, a 95% delay profile, and a 99% delay profile, as observed at the matching engine, when a reorder buffer is positioned in the server before the matching engine is reached.

As shown, for RBP values less than 3 microseconds, trade orders through the first gateway and trade orders through the second gateway both have 4, 4, and 5 microsecond delays in the 50%, 95% and 99% delay profiles, respectively. That is, of the trade orders reaching the matching engine, 50% had a delay of 4 microseconds or less, 95% also had a delay of 4 microseconds or less, and 99% had a delay of 5 microseconds or less. It was experimentally observed that when there is no active reorder buffer, the corresponding 50%, 95% and 99% delay profiles yield 3, 3, and 4 microseconds, indicating that the reorder buffer added 1 microsecond of delay.

In the example experimental electronic trading network, as shown in FIGS. 8A and 8B, almost all trade orders received at the matching engine are in order when the RBP is set to 8 microseconds. FIG. 9A illustrates that, when RBP is set at 8 microseconds, delays of 6, 6 and 7 microseconds are observed in the 50%, 95% and 99% delay profiles, respectively. FIG. 9B illustrates that, when RBP is set at 8 microseconds, delays of 8, 9 and 9 microseconds are observed in the 50%, 95% and 99% delay profiles, respectively. This observation is consistent with an indication that trade orders entering the electronic trading system's network through the first gateway experience more of a delay in the electronic trading system's network than those that enter through the second gateway.

Description of FIG. 10

FIG. 10 is similar to FIG. 4 in that they both illustrate reorder buffer circuitry. Whereas FIG. 4 illustrates an embodiment with one reorder buffer, FIG. 10 reorder buffer circuitry includes at least two reorder buffers 1002 (reorder buffer 1002a and 1002b) and supports selectively enqueuing trade orders to respective reorder buffers based on a message type of each trade order. The trade order storage for the two reorder buffers 1002a and 1002b may be implemented in separate memory areas or separate sets of registers, and each reorder buffer may be controlled according to its own parameters such as RBP.

Reorder logic 1012, flush timer 1008 and reorder buffer config 1010 may operate similarly to reorder logic 412, flush timer 408, and reorder buffer config 1010, respectively, and include support for the two or more reorder buffers. For example, reorder logic 1012 may enqueue an incoming trade order based on its message type and separately perform reordering in the respective buffers, independently of each other. In the example stream of trade orders 1004 shown in FIG. 10, the first three trade orders each of which have a "B" (buy order) or "S" (sell order) message type are enqueued to reorder buffer 1002a, but the fourth trade order, which has a "C" (cancel order) message type, is enqueued to the reorder buffer 1002b.

Flush timer 1008 may be implemented as a separate flush timer for each of the reorder buffers, with each flush timer operating, for example, according to process 600. Reorder buffer config 1010 may separately configure (e.g., calculate RBP) for each of the reorder buffers using, for example, a process such as process 700.

Thus, expanding on the example outlines above with respect to FIG. 10, separate flush timers may operate on reorder buffers 1002a and 1002b, with the RBP for 1002b buffer being set to a lower value than the RBP for the 1002a buffer. In this manner, at the output 1006 from reorder buffers 1002 the "cancel order" may be output in a more timely (rather than at the tail end of the four trade orders shown in 1004 in $T_s$ order) manner even while the "buy order" and "sell order" trade orders are executed in $T_{gw}$ order. That permits, for example, where the "cancel order" relates to the "sell order" which has $T_{gw}=1$, the "cancel order" to be sent to the electronic trading application faster and more closely following the related "sell order" rather than at the very end of the stream 1004 with $T_{gw}=4$. Similarly, multiple reorder buffers may enable a "modify order" to be sent to the electronic trading application via a second reorder buffer before the corresponding "buy order" or "sell order" sent via a first reorder buffer is executed by the electronic trading application.

Although FIG. 10 illustrates two reorder buffers, other embodiments may include more than two reorder buffers and/or any number of message types categorized for the respective reorder buffers. Whereas the above described embodiments associated with FIG. 10 are described in relation to separately configured flush timers and/or RBP for the respective reorder buffers, some embodiments may include reorder buffer config 1010 determining flush timers and/or RBP for the respective reorder buffers in a joint manner in accordance with the types of messages designated and/or the traffic volume for each reorder buffer.

Description of FIG. 11

FIG. 11 illustrates a process 1100 for reordering trade orders based on a message type attached to each trade order, in addition to the $T_{gw}$ and $T_s$ timestamps.

After entering process 1100, at operation 1102 two or more reorder buffers are configured. Reorder buffer configuration may be performed in accordance with a process such as process 700. Configuration may include setting message types mapped to each reordering buffer, an RBP for each reorder buffer, etc. According to an embodiment, a first reorder buffer (such as reorder buffer 1002a) may be mapped to receive "buy orders" and "sell orders", and a second reorder buffer (such as reorder buffer 1002b) may be mapped to receive "cancel order" trade orders. The RBP for the second reorder buffer may be set to a shorter value to ensure that the "cancel order" instructions are processed closely in time with the related buy order or sell order.

At operation 1106, a trade order is received. The received order includes order information, a message type, $T_{gw}$ and $T_s$. According to an embodiment, the message type field may be encoded at a gateway, and may identify the trade order as one or a "buy order", "sell order" or "cancel order".

At operation 1107, one of the reorder buffers is selected based on the message type of the received trade order. For example, if the received trade order is a "buy order" or "sell order" then it is enqueued to the first reorder buffer (e.g., reorder buffer 1002a), or if the received trade order is a "cancel order", it is enqueued to the second reorder buffer (e.g., reorder buffer 11002b).

At operation 1108, $T_{delay}$ for the received trade order is determined in accordance with the $T_s$ and $T_{gw}$. A process such as that described in relation to operation 508 above may be used to determine $T_{delay}$.

At operation 1110, it is determined whether the $T_{delay}$ or the trade order exceeds to RBP of the selected reorder buffer.

If at operation 1110 it is determined that the $T_{delay}$ does not exceed the selected reorder buffer's RBP, then at operation 1112, the trade order is enqueued to the selected reorder buffer in a manner that the trade orders in that reorder buffer are in $T_{gw}$ order.

If at operation 1110 it is determined that the $T_{delay}$ does exceed the selected reorder buffer's RBP, then at operation 1114, the trade order is passed to the matching engine without being enqueued to a reorder buffer.

Process 1100 is repeated for each trade order received at the server.

Description of FIG. 12

FIG. 12 illustrates a process 1200 for reordering trade orders based on a message type attached to each trade order, in addition to the $T_{gw}$ and $T_s$ timestamps. In contrast to process 1100, process 1200 enables differentially treating trade orders based on message type using only a single reorder buffer.

After entering process 1200, at operation 1202, the reorder buffer is configured. The configuration may be performed in accordance with a process such as process 700. However, in this instance, more than one RBP is configured for the reorder buffer. According to an example implementation, a first RBP may be determined for the group of actual orders such as all "buy orders" and "sell orders" as identified by their respective message types, and a second RBP may be determined for the non-orders such as "cancel order". As noted above, in some embodiments, the second RBP may be configured to a smaller value than the first RBP, in order to improve the possibility that the "cancel order" will closely follow the related buy order or sell order.

At operation 1206 a trade order is received at the server. The received order includes order information, a message type, $T_{gw}$ and $T_s$. According to an embodiment, the message type field may be encoded at a gateway, and may identify the trade order as one or a "buy order", "sell order" or "cancel order".

At operation 1208, $T_{delay}$ for the received trade order is determined in accordance with the $T_s$ and $T_{gw}$. A process such as that described in relation to operation 508 above may be used to determine $T_{delay}$.

At operation 1210, it is determined whether the $T_{delay}$ or the trade order exceeds to RBP of the selected reorder buffer. For example, if the received trade order is a "buy order" or "sell order", then the RBP for the first reorder buffer is compared. On the other hand, if the received trade order is a "cancel order", then the RBP for the second reorder buffer is compared.

If at operation 1210 it is determined that the $T_{delay}$ does not exceed the selected reorder buffer's RBP, then at operation 1212, the trade order is enqueued to the selected reorder buffer in a manner that the trade orders in that reorder buffer are in $T_{gw}$ order.

If at operation 1210 it is determined that the $T_{delay}$ does exceed the selected reorder buffer's RBP, then at operation 1214, the trade order is passed to the matching engine without being enqueued to a reorder buffer.

Process 1200 is repeated for each trade order received at the server.

In some example embodiments, alternatively or additionally to having a per-reorder buffer RBP, the calculated Tdelay may be calculated in a manner that is based on the message type. For example, Tdelay alone or the combination of Tdelay and RBP may be calculated so that the trade orders in the second reorder buffer reside for shorter durations in the reorder buffer.

The embodiments described in relation to FIGS. 10-12 provide for differentiated reordering based on message type. In some other embodiments, instead of, or in addition to, the message type, trade orders may be differentiated for reordering based on at least another field (e.g., internal client ID). These embodiments provide for, among other things, to allow processing of buy/sell orders and the like for which time ordering with respect to each other is very important, while simultaneously enabling control transactions (e.g., cancel order, etc.) to be processed outside of the main reordering process.

Description of FIG. 13

FIG. 13 schematically illustrates a computer that can be used to implement the re-ordering framework, according to some example embodiments. FIG. 13 is a block diagram of an example computing device 1300 (which may also be referred to, for example, as a "computing device," "computer system," or "computing system") according to some embodiments. In some embodiments, the computing device 1300 includes one or more of the following: one or more processors 1302; one or more memory devices 1304; one or more network interface devices 1306; one or more display interfaces 1308; and one or more user input adapters 1310. Additionally, in some embodiments, the computing device 1300 is connected to or includes a display device 1312. As will explained below, these elements (e.g., the processors 1302, memory devices 1304, network interface devices 1306, display interfaces 1308, user input adapters 1310, display device 1312) are hardware devices (for example, electronic circuits or combinations of circuits) that are configured to perform various different functions for the computing device 1300.

In some embodiments, each or any of the processors 1302 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1302 uses an instruction set architecture such as x86 or Advanced RISC Machine (ARM).

In some embodiments, each or any of the memory devices 1304 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1302). Memory devices 1304 are examples of non-volatile computer-readable storage media.

In some embodiments, each or any of the network interface devices 1306 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1308 is or includes one or more circuits that receive data from the processors 1302, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1312, which displays the image data. Alternatively or additionally, in some embodiments, each or any of the display interfaces 1308 is or includes, for example, a video card, video adapter, or graphics processing unit (GPU).

In some embodiments, each or any of the user input adapters 1310 is or includes one or more circuits that receive and process user input data from one or more user input devices (not shown in FIG. 13) that are included in, attached to, or otherwise in communication with the computing device 1300, and that output data based on the received input data to the processors 1302. Alternatively or additionally, in some embodiments each or any of the user input adapters 1310 is or includes, for example, a PS/2 interface, a USB interface, a touchscreen controller, or the like; and/or the user input adapters 1310 facilitates input from user input devices (not shown in FIG. 13) such as, for example, a keyboard, mouse, trackpad, touchscreen, etc.

In some embodiments, the display device 1312 may be a Liquid Crystal Display (LCD) display, Light Emitting Diode (LED) display, or other type of display device. In embodiments where the display device 1312 is a component of the computing device 1300 (e.g., the computing device and the display device are included in a unified housing), the display device 1312 may be a touchscreen display or non-touchscreen display. In embodiments where the display device 1312 is connected to the computing device 1300 (e.g., is external to the computing device 1300 and communicates with the computing device 1300 via a wire and/or via wireless communication technology), the display device 1312 is, for example, an external monitor, projector, television, display screen, etc.

In various embodiments, the computing device 1300 includes one, or two, or three, four, or more of each or any of the above-mentioned elements (e.g., the processors 1302, memory devices 1304, network interface devices 1306, display interfaces 1308, and user input adapters 1310). Alternatively or additionally, in some embodiments, the computing device 1300 includes one or more of: a processing system that includes the processors 1302; a memory or storage system that includes the memory devices 1304; and a network interface system that includes the network interface devices 1306.

The computing device 1300 may be arranged, in various embodiments, in many different ways. As just one example, the computing device 1300 may be arranged such that the processors 1302 include: a multi (or single)-core processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 1300 may be arranged such that: the processors 1302 include two, three, four, five, or more multi-core processors; the network interface devices 1306 include a first network interface device that implements Ethernet and a second network interface device that implements WiFi and/or Bluetooth; and the memory devices 1304 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the server infrastructure 102, server 104, gateway infrastructure 106, gateways 107, client terminals 128, reorder buffers 112 and 1012, reorder control 114 and 1014, gateway timestamp component 122, server timestamp component 116, edge timestamp component 144, timestamp selection component 150, clock synchronization components 146, 124 and 118, electronic trading application 110, gateway application 120, client applications 130, each of which will be referred to individually for clarity as a "component" for the remainder of this paragraph, are implemented using an example of the computing device 1300 of FIG. 13. In such embodiments, the following applies for each component: (a) the elements of the 1300 computing device 1300 shown in FIG. 13 (i.e., the one or more processors 1302, one or more memory devices 1304, one or more network interface devices 1306, one or more display interfaces 1308, and one or more user input adapters 1310), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1304 (e.g., in various embodiments, in a volatile memory device such as a RAM or an instruction register and/or in a non-volatile memory device such as a flash memory or hard disk) and all actions described herein as performed by the software modules are performed by the processors 1302 in conjunction with, as appropriate, the other elements in and/or connected to the computing device 1300 (i.e., the network interface devices 1306, display interfaces 1308, user input adapters 1310, and/or display device 1312); (c) alternatively or additionally, to the extent it is described herein that the component processes and/or otherwise handles data, in some embodiments, such data is stored in the memory devices 1304 (e.g., in some embodiments, in a volatile memory device such as a RAM and/or in a non-volatile memory device such as a flash memory or hard disk) and/or is processed/handled by the processors 1302 in conjunction, as appropriate, the other elements in and/or connected to the computing device 1300 (i.e., the network interface devices 1306, display interfaces 1308, user input adapters 1310, and/or display device 1312); (d) alternatively or additionally, in some embodiments, the memory devices 1302 store instructions that, when executed by the processors 1302, cause the processors 1302 to perform, in conjunction with, as appropriate, the other elements in and/or connected to the computing device 1300 (i.e., the memory devices 1304, network interface devices 1306, display interfaces 1308, user input adapters 1310, and/or display device 1312), each or any combination of actions described herein as performed by the component and/or by any software modules described herein as included within the component.

The hardware configurations shown in FIG. 13 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 13, (e) via other hardware arrangements, architectures, and configurations, and/or via combinations of the technology described in (a) through (e).

Additional Applications of Described Subject Matter

Although the above described embodiments relate primarily to trading investment instruments in an electronic trading system which may include constraints related to real-time processing embodiments are not limited thereto. For example, other embodiments may include a corporate or other network in which messages (e.g., packet or other unit of data transmission for an application) are reordered at a computer before they are submitted for an application running on that computer for processing.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), ATP, Bluetooth, and TCP/IP, TDMA, CDMA, 3G, etc.; and/or (iv) encrypted to ensure privacy or prevent fraud in any of a variety of ways well known in the art.

Technical Advantages of Described Subject Matter

Certain example embodiments may provide improved application execution times and better throughput for applications, such as, but not limited to, electronic trading. According to embodiments, systems and methods are provided for eliminating and/or reducing out of order messages that are input to an application, thereby altogether avoiding or at least reducing negative performance effects imposed on the application for having to do additional processing associated with appropriately handling out of order transactions.

Alternatively or additionally, some example embodiments may improve performance consistency of an electronic trading system thereby improving the capability of the electronic trading system to provide and/or conform to guarantees that orders for trading an investment instrument and the like will be processed in order of the time at which the respective orders are received in the electronic trading system. Some example embodiments hide effects of jitter that is introduced in the network of the electronic trading system, so as to present client systems interacting with the electronic trading system a guarantee that irrespective of jitter and latency variations due to geographic distribution experienced by packets in the electronic trading system's network, client orders will be processed in the order that they first enter the electronic trading system. In addition to improving the reliability and predictability of the electronic trading system as presented to client systems, the ability to provide such assurances also increases the scalability of the electronic system by allowing the network to expand to geographically distant destinations while still allowing client systems to rely on their orders being processed in order (e.g. earliest to latest) of when they entered the electronic trading system network.

Thus, certain embodiments provide a technical solution to a technical problem. For example, the embodiments overcome or alleviate issues of jitter and other latency variation that are inherent in a geographically-distributed communication network by providing a solution based on a reordering buffer.

As noted above, embodiments are not limited to electronic trading of investment instruments. Thus, the advantages described above related to reducing out of order messages being provided to applications apply also to other types of distributed systems and applications other than electronic trading.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

While the technology has been described in connection with what is presently considered to be the most practical and preferred embodiment, it is to be understood that the technology is not to be limited to the disclosed embodiment, but on the contrary, is intended to cover various modifications and equivalent arrangements.

The invention claimed is:

1. A distributed computer system for addressing variance in network communication latency from multiple different physical locations, the distributed computer system comprising:
   a communication infrastructure;
   a server infrastructure system comprising a memory and a reorder buffer configured in the memory and associated with a flush timer; and
   a plurality of gateway infrastructure systems located at a plurality of geographically distributed locations at different distances from the server infrastructure system and connected to the server infrastructure system by the communication infrastructure, wherein packet latencies from respective gateway infrastructure systems to the server infrastructure system over respectively different paths through the communications infrastructure are different,
   wherein each of the plurality of gateway infrastructure systems is configured to perform operations comprising:
      receiving incoming data transaction request packets from one or more client computer systems;
      for each of the received incoming data transaction request packets:
         attaching a respective gateway timestamp to the incoming data transaction request packet, the respective gateway timestamp corresponding to either a time at which the incoming data transaction request packet is in the gateway infrastructure system or a time at which the incoming data transaction was in a network device located between the gateway infrastructure system and a client computer system from the one or more client computer systems from which the incoming data transaction request packet originated; and
         transmitting the gateway timestamp-attached data transaction request packet to the server infrastructure system via the communication infrastructure; and
   wherein the server infrastructure system is configured to perform operations comprising:
      receiving each of the gateway timestamp-attached data transaction request packets from the plurality of gateway infrastructure systems via the communication infrastructure;
      for each of the gateway timestamp-attached data transaction request packets:
         attaching a server timestamp to the gateway timestamp-attached data transaction request packet, the server timestamp corresponding to a time at which the gateway timestamp-attached data transaction request packet is in the server infrastructure system;
         determining a transaction delay based upon the gateway timestamp and the server timestamp attached to the server timestamp-attached data transaction request packet;
         comparing the transaction delay to a preset threshold time interval, and:
            if the transaction delay is less than the preset threshold time interval, assigning, using the flush timer, a respective flush time to the gateway timestamp-attached data transaction request packet and insert the gateway timestamp-attached transaction request packet into the reorder buffer; or if the transaction delay is not less than the preset threshold time interval, outputting the gateway timestamp-attached data transaction request packet to a data processing application without storing the gateway timestamp-attached data transaction request packet in the reorder buffer;

reordering, using the reorder buffer, the server timestamp-attached data transaction request packets in order of oldest to newest of the respective gateway timestamps of the server timestamp-attached data transaction request packets, wherein the reordering is based on both the gateway timestamp and the server timestamp of respective ones of the server timestamp-attached data transaction request packets; and outputting the reordered server timestamp-attached data transaction request packets from the reorder buffer in an order of oldest to newest of the respective gateway timestamps and in accordance with the respective associated flush times, via a shared memory pipe, to the data processing application, wherein the data processing application is configured to process the data transaction request packets in order of receipt at the data processing application;

wherein the server infrastructure system is configured to perform the reordering and the outputting such that the output server timestamp-attached data transaction request packets are received by the data processing application in order of arrival at the plurality of gateway infrastructure systems, even if the corresponding gateway timestamp-attached transaction request packets arrived out of order at the server infrastructure due to the different packet latencies and jitter in the communication infrastructure between the plurality of gateway infrastructure systems and the server infrastructure system.

2. The distributed computer system according to claim 1, wherein the server infrastructure system is further configured to perform operations comprising:

determining statistics for transaction delay of a plurality of gateway timestamp-attached data transaction request packets received at the server infrastructure systems, the statistics being based on a difference between a server time stamp and a gateway timestamp-attached to each of the plurality of data transaction request packets; and selecting the preset threshold time interval based upon the determined statistics.

3. The distributed computer system according to claim 2, wherein the server infrastructure system is further configured to perform selecting the preset threshold time interval based upon the determined statistics, an out of order packet tolerance threshold, and a reorder buffer delay threshold.

4. The distributed computer system according to claim 2, wherein the server infrastructure system is further configured to perform repeatedly selecting the preset threshold time interval at regular time intervals and/or in accordance with load.

5. The distributed computer system according to claim 1, wherein a duration of each data transaction request packet in the reorder buffer is controlled by the flush timer based on server timestamps attached to the data transaction request packet.

6. The distributed computer system according to claim 5, wherein the duration of a particular data transaction request packet in the reorder buffer is controlled by the flush timer further based on a delay variance determined using a plurality of the data transaction request packets.

7. The distributed computer system according to claim 6, wherein the flush timer is configured to trigger flushing of the particular data transaction request packet from the reorder buffer when a sum of the determined delay variance and a value of the gateway timestamp of the particular data transaction request packet equals or exceeds a current time.

8. The distributed computer system according to claim 5, wherein the flush timer is configured in accordance with a maximum delay determined using a plurality of data transaction request packet.

9. The distributed computer system according to claim 8, wherein the flush timer is configured to trigger flushing of a particular data transaction request packet from the reorder buffer when a sum of the determined maximum delay and a value of the server timestamp of the particular data transaction request packet equals or exceeds a current time.

10. The distributed computer system according to claim 9, further comprising a field programmable gate array (FPGA) which includes the reorder buffer.

11. The distributed computer system according to claim 1, further comprising a clock synchronization system including a respective clock synchronization module in each of the gateway infrastructure systems and in the server infrastructure system, wherein the clock synchronization system is configured to maintain synchronization of clocks in each gateway infrastructure system and the server infrastructure system within a predetermined threshold drift.

12. The distributed computer system according to claim 11, wherein each of the gateway infrastructure systems and the server infrastructure system includes a respective hardware-based time stamping device that generates timestamps that are attached to data transaction request packets upon ingress.

13. The distributed computer system according to claim 12, wherein the respective hardware-based time stamping device is located in a network interface card.

14. The distributed computer system according to claim 1, wherein each gateway infrastructure system comprises another reorder buffer to provide reordering of data transaction request packets received from client computer systems and being transmitted to the server infrastructure system.

15. The distributed computer system according to claim 1, wherein the received plurality of gateway timestamp-attached data transaction request packet each has a message type, wherein the server infrastructure system is further configured to perform selectively, based on the message type of each data transaction request packet, distributing a first set of the received data transaction request packets into the reorder buffer and a second set of the received data transaction request packets into another reorder buffer;

wherein the reordering comprises separately reordering the reorder buffer and the another reorder buffer.

16. The distributed computer system according to claim 15, wherein the reorder buffer is associated with the preset threshold time interval and the another reorder buffer is associated with another preset threshold time interval, wherein the separately reordering includes reordering the first reorder buffer with respect to the preset threshold time interval and reordering the second reorder buffer with respect to the another preset threshold time interval.

17. The distributed computer system according to claim 1, wherein the received plurality of gateway timestamp-attached data transaction request packets each having a message type, and
wherein the server infrastructure system is further configured to perform operations comprising:
configuring a first time threshold associated with a first message type, and a second time threshold associated with a second message type;
selectively, based on the message type of each data transaction request packet, reorder a first set of the received data transaction request packets based on the first time threshold and reorder a second set of the received data transaction request packets based on the second time threshold.

18. A method for addressing variance in network communication latency from multiple different physical locations in a distributed computer system, the method performed using at least one processor of a server infrastructure system of the distributed computer system, wherein the server infrastructure system includes a reorder buffer and an associated flush timer and is connected through a communication infrastructure to a plurality of gateway infrastructure systems located at a plurality of geographically distributed locations at different distances from the server infrastructure system, wherein packet latencies from respective gateway infrastructure systems to the server infrastructure system over respectively different paths through the communications infrastructure are different, the method comprising:
receiving each of a plurality of gateway timestamp-attached data transaction request packets from a plurality of gateway infrastructure systems via the communication infrastructure, wherein a respective gateway timestamp is attached to each gateway timestamp-attached data transaction request packet, the respective gateway timestamp corresponds to either a time at which a respective corresponding incoming data transaction request packet is in the gateway infrastructure system or in a network device located between the gateway infrastructure system and a client computer system from the one or more client computer systems from which the respective corresponding incoming data transaction request packet originated;
for each of the gateway timestamp-attached data transaction request packets:
attaching a server timestamp to the gateway timestamp-attached data transaction request packet, the server timestamp corresponding to a time at which the gateway timestamp-attached data transaction request packet is in the server infrastructure system;
determining a transaction delay based upon the gateway timestamp and the server timestamp attached to the server timestamp-attached data transaction request packet;
comparing the transaction delay to a preset threshold time interval, and:
if the transaction delay is less than the preset threshold time interval, assigning, using the flush timer, a respective flush time to the gateway timestamp-attached data transaction request packet and insert the gateway timestamp-attached transaction request packet into the reorder buffer; or
if the transaction delay is not less than the preset threshold time interval, outputting the gateway timestamp-attached data transaction request packet to a data processing application without storing the gateway timestamp-attached data transaction request packet in the reorder buffer;
reordering, using the reorder buffer, the server timestamp-attached data transaction request packets in order of oldest to newest of the respective gateway timestamps of the server timestamp-attached data transaction request packets, wherein the reordering is based on both the gateway timestamp and the server timestamp of respective ones of the server timestamp-attached data transaction request packets; and
outputting the reordered server timestamp-attached data transaction request packets from the reorder buffer in an order of oldest to newest of the respective gateway timestamps and in accordance with the respective associated flush times, via a shared memory pipe, to the data processing application, wherein the data processing application is configured to process the data transaction request packets in order of receipt at the data processing application;
wherein the server infrastructure system is configured to perform the reordering and the outputting such that the output server timestamp-attached data transaction request packets are received by the data processing application in order of arrival at the plurality of gateway infrastructure systems, even if the corresponding gateway timestamp-attached transaction request packets arrived out of order at the server infrastructure due to the different packet latencies and jitter in the communication infrastructure between the plurality of gateway infrastructure systems and the server infrastructure system.

19. A non-transitory computer readable storage medium having stored therein computer program instructions for addressing variance in network communication latency from multiple different physical locations in a distributed computer system, the computer program instructions, when performed using at least one processor of a server infrastructure system of the distributed computer system, wherein the server infrastructure system includes a reorder buffer and an associated flush timer and is connected through a communication infrastructure to a plurality of gateway infrastructure systems located at a plurality of geographically distributed locations at different distances from the server infrastructure system and wherein packet latencies from respective gateway infrastructure systems to the server infrastructure system over respectively different paths through the communications infrastructure are different, cause the server infrastructure system to perform operations comprising:
receiving each of a plurality of gateway timestamp-attached data transaction request packets from a plurality of gateway infrastructure systems via the communication infrastructure, wherein a respective gateway timestamp is attached to each gateway timestamp-attached data transaction request packet, the respective gateway timestamp corresponds to either a time at which a respective corresponding incoming data transaction request packet is in the gateway infrastructure system or in a network device located between the gateway infrastructure system and a client computer system from the one or more client computer systems from which the respective corresponding incoming data transaction request packet originated;
for each of the gateway timestamp-attached data transaction request packets:
attaching a server timestamp to the gateway timestamp-attached data transaction request packet, the server timestamp corresponding to a time at which the gateway timestamp-attached data transaction request packet is in the server infrastructure system;

determining a transaction delay based upon the gateway timestamp and the server timestamp attached to the server timestamp-attached data transaction request packet;

comparing the transaction delay to a preset threshold time interval, and:

if the transaction delay is less than the preset threshold time interval, assigning, using the flush timer, a respective flush time to the gateway timestamp-attached data transaction request packet and insert the gateway timestamp-attached transaction request packet into the reorder buffer; or if the transaction delay is not less than the preset threshold time interval, outputting the gateway timestamp-attached data transaction request packet to a data processing application without storing the gateway timestamp-attached data transaction request packet in the reorder buffer;

reordering, using the reorder buffer, the server timestamp-attached data transaction request packets in order of oldest to newest of the respective gateway timestamps of the server timestamp-attached data transaction request packets, wherein the reordering is based on both the gateway timestamp and the server timestamp of respective ones of the server timestamp-attached data transaction request packets; and outputting the reordered server timestamp-attached data transaction request packets from the reorder buffer in an order of oldest to newest of the respective gateway timestamps and in accordance with the respective associated flush times, via a shared memory pipe, to the data processing application, wherein the data processing application is configured to process the data transaction request packets in order of receipt at the data processing application;

wherein the server infrastructure system is configured to perform the reordering and the outputting such that the output server timestamp-attached data transaction request packets are received by the data processing application in order of arrival at the plurality of gateway infrastructure systems, even if the corresponding gateway timestamp-attached transaction request packets arrived out of order at the server infrastructure due to the different packet latencies and jitter in the communication infrastructure between the plurality of gateway infrastructure systems and the server infrastructure system.

\* \* \* \* \*